United States Patent [19]
Toti

[11] 3,827,222
[45] Aug. 6, 1974

[54] ROW CROP HARVESTING MACHINE

[76] Inventor: Andrew J. Toti, 311 W. River Rd., Modesto, Calif. 95351

[22] Filed: June 12, 1972

[21] Appl. No.: 262,128

[52] U.S. Cl. .............................................. 56/330
[51] Int. Cl. ........................................... A01g 19/00
[58] Field of Search ................... 56/328 R, 329, 330

[56] References Cited
UNITED STATES PATENTS

| | | | |
|---|---|---|---|
| 3,006,131 | 10/1961 | McDowell.............................. | 56/330 |
| 3,153,311 | 10/1964 | Pool...................................... | 56/328 R |
| 3,380,235 | 4/1968 | Smith et al............................ | 56/328 R |
| 3,396,521 | 8/1968 | McKibben et al. ................... | 56/330 |
| 3,417,558 | 12/1968 | Granger................................ | 56/328 R |
| 3,458,982 | 8/1969 | Lasswell, Jr.......................... | 56/328 R |
| 3,478,501 | 11/1969 | Patzlaff................................. | 56/330 |
| 3,590,566 | 7/1971 | Cutts, Sr. et al..................... | 56/330 |
| 3,601,962 | 8/1971 | Townsend............................. | 56/328 R |
| 3,701,242 | 10/1972 | Townsend............................. | 56/328 R |

*Primary Examiner*—Russell R. Kinsey

[57] ABSTRACT

A machine for harvesting various row crops of which grapes are exemplary. The subject machine includes a plurality of selectively positionable picking units mounted on a self-propelled carriage on opposite sides and above the row crop to be picked. Each picking unit includes a plurality of picking arms designed to rotate selectively about their respective individual axes. Each picking arm includes an offset nose portion which moves eccentrically relative to the axis of the arm for most effective picking. Each picking unit preferably is adjustably mounted on the movable carriage so that the picking angle of the respective arms may be selectively oriented relative to the row crop being harvested. Each picking unit also may be mounted for reciprocal motion relative to the row crop to further enhance effective picking. Collecting means is provided in conjunction with the picking units for gathering the crop and conveying the same automatically to an accompanying gondola truck or trailer for transportation to a processing plant.

76 Claims, 14 Drawing Figures

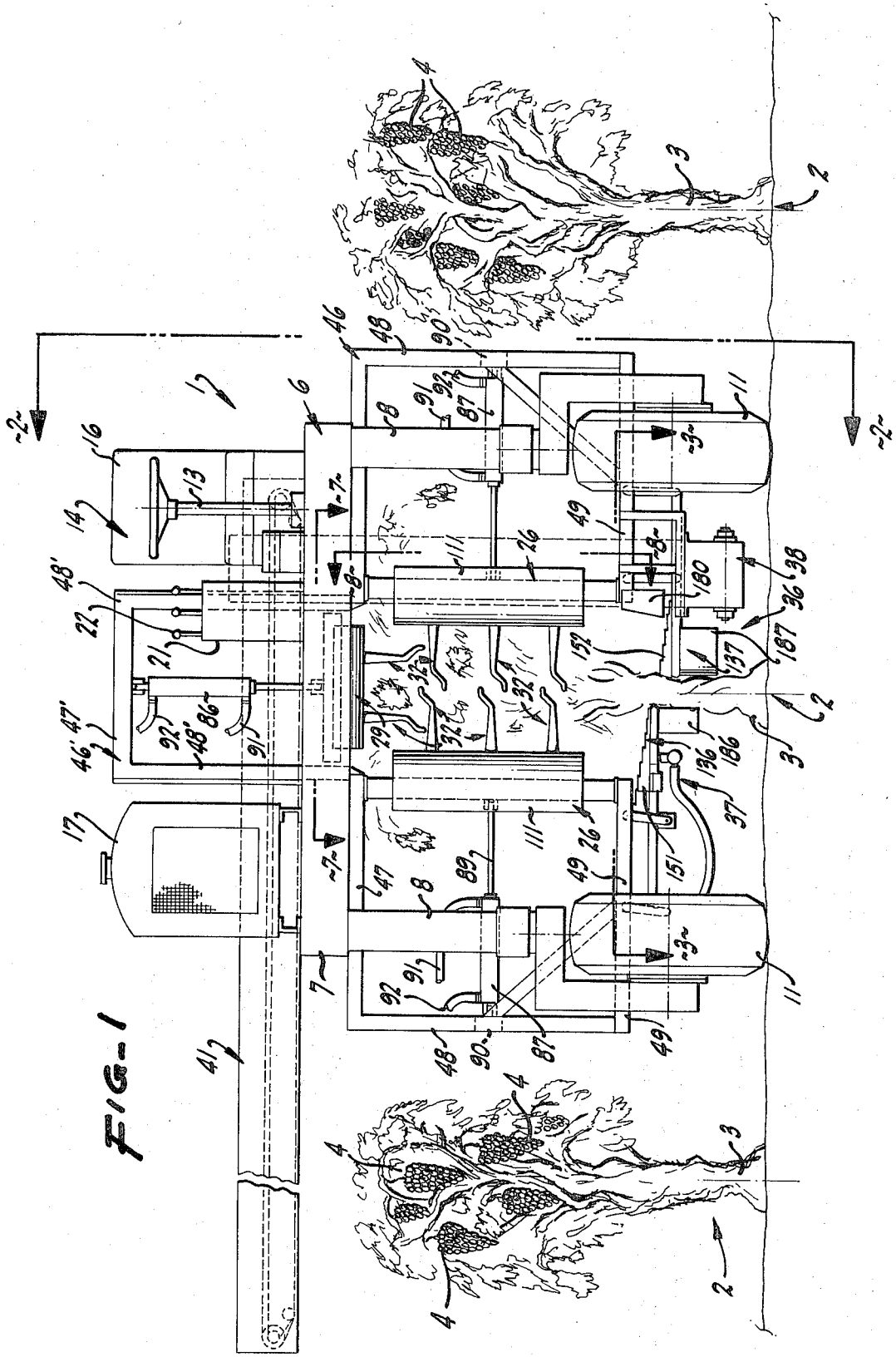

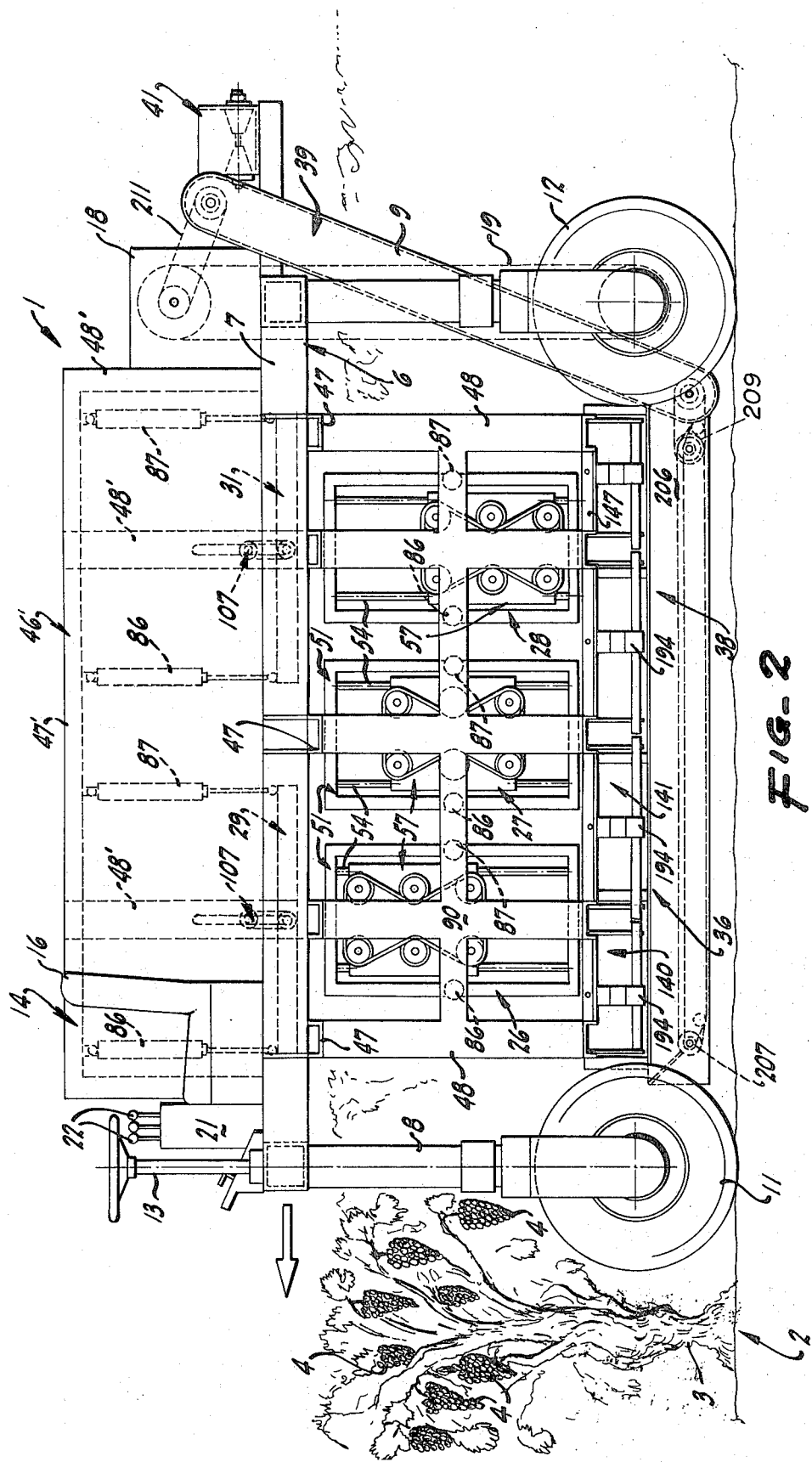

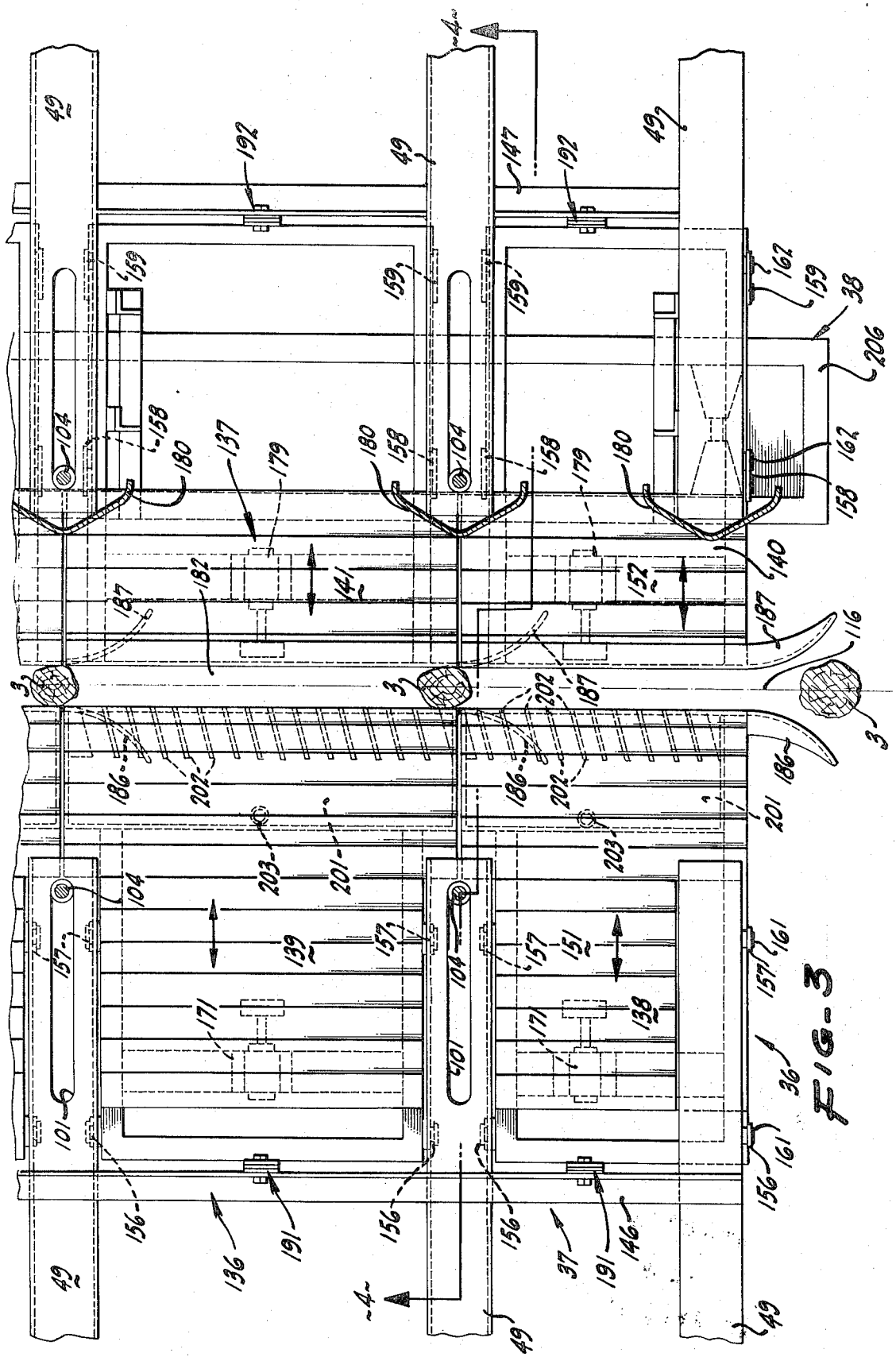

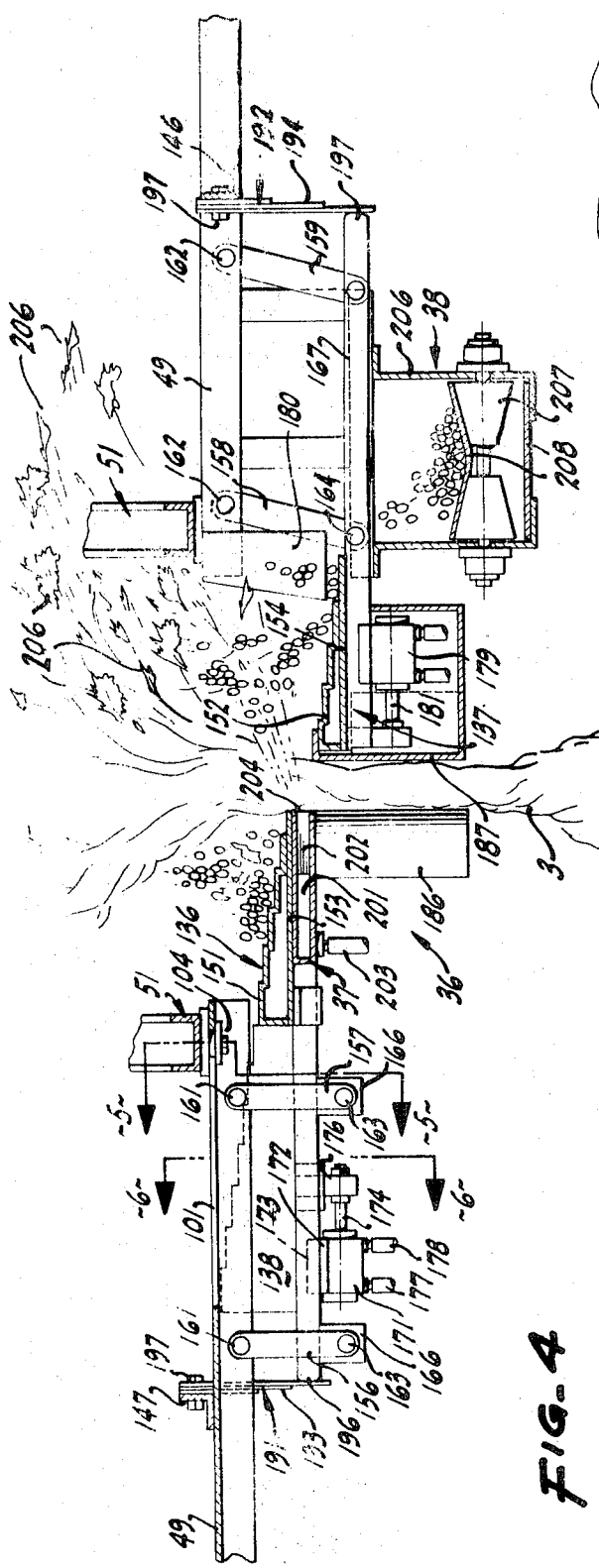
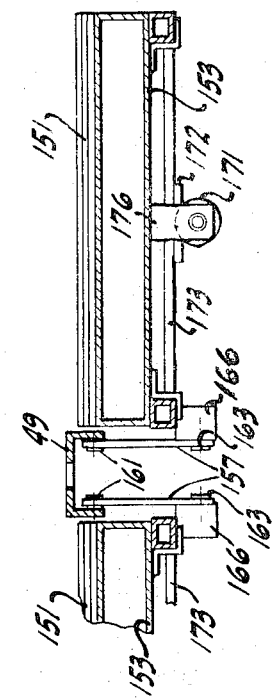
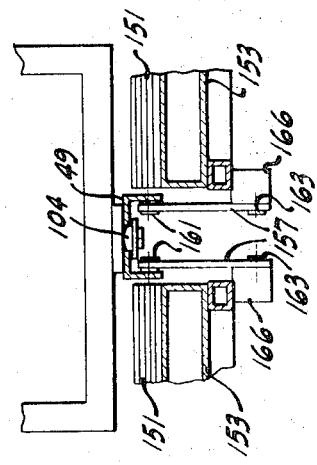

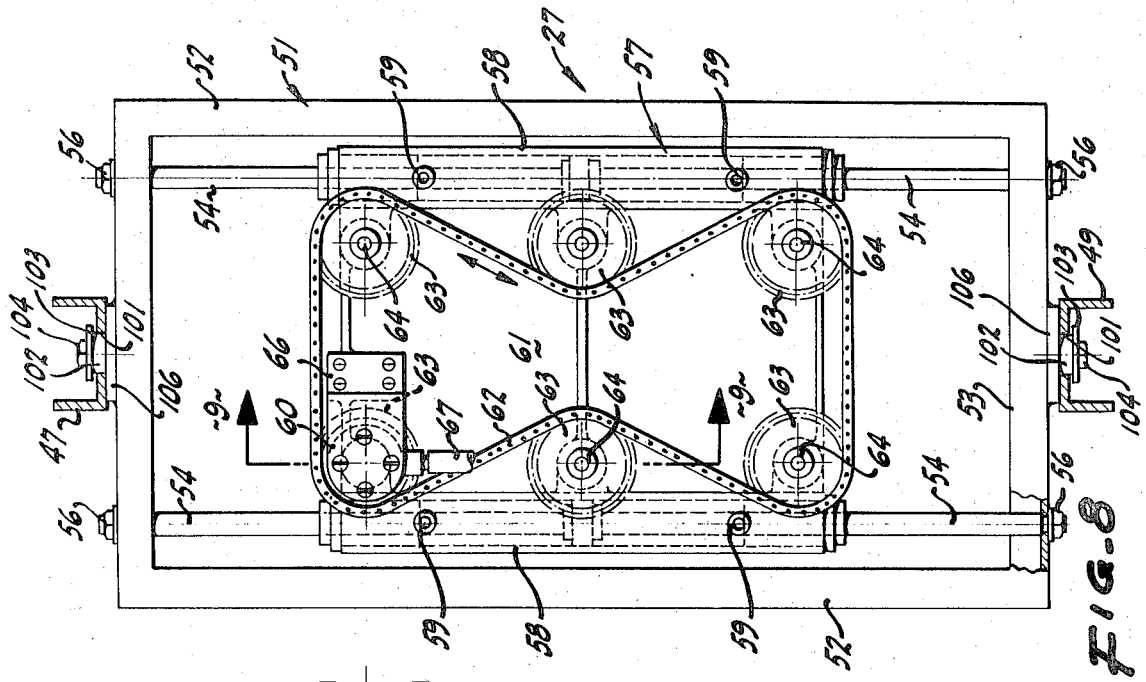
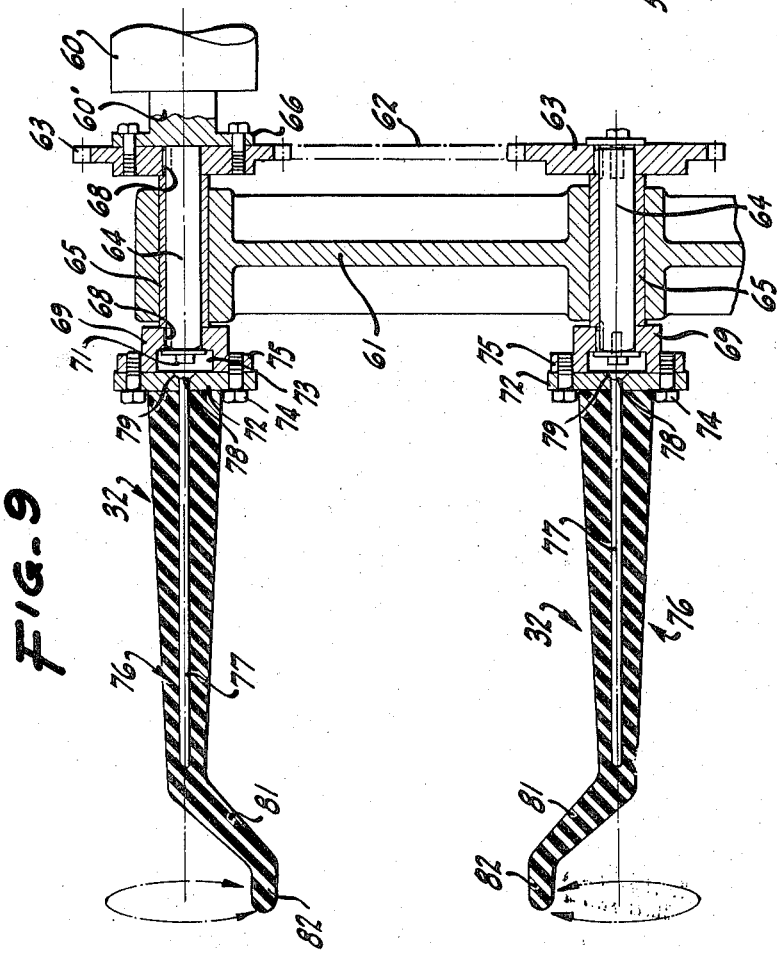

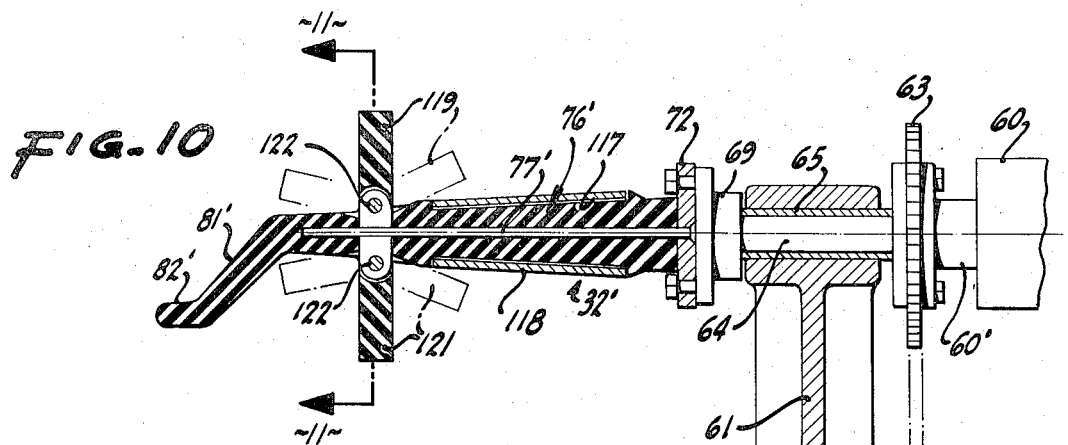
FIG.-10
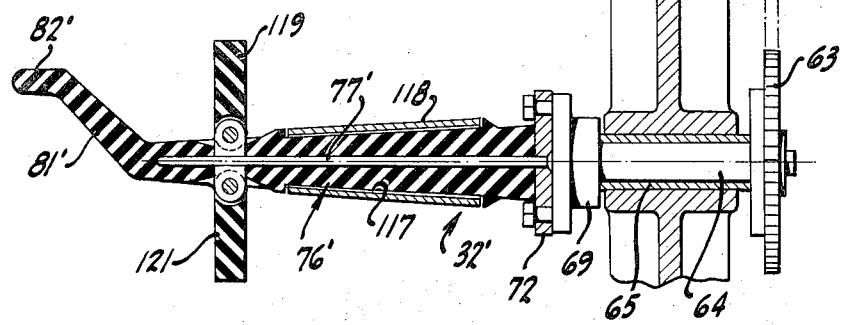
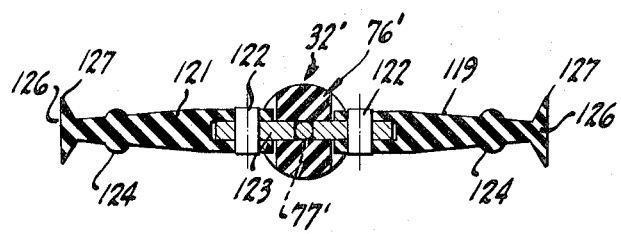
FIG.-11

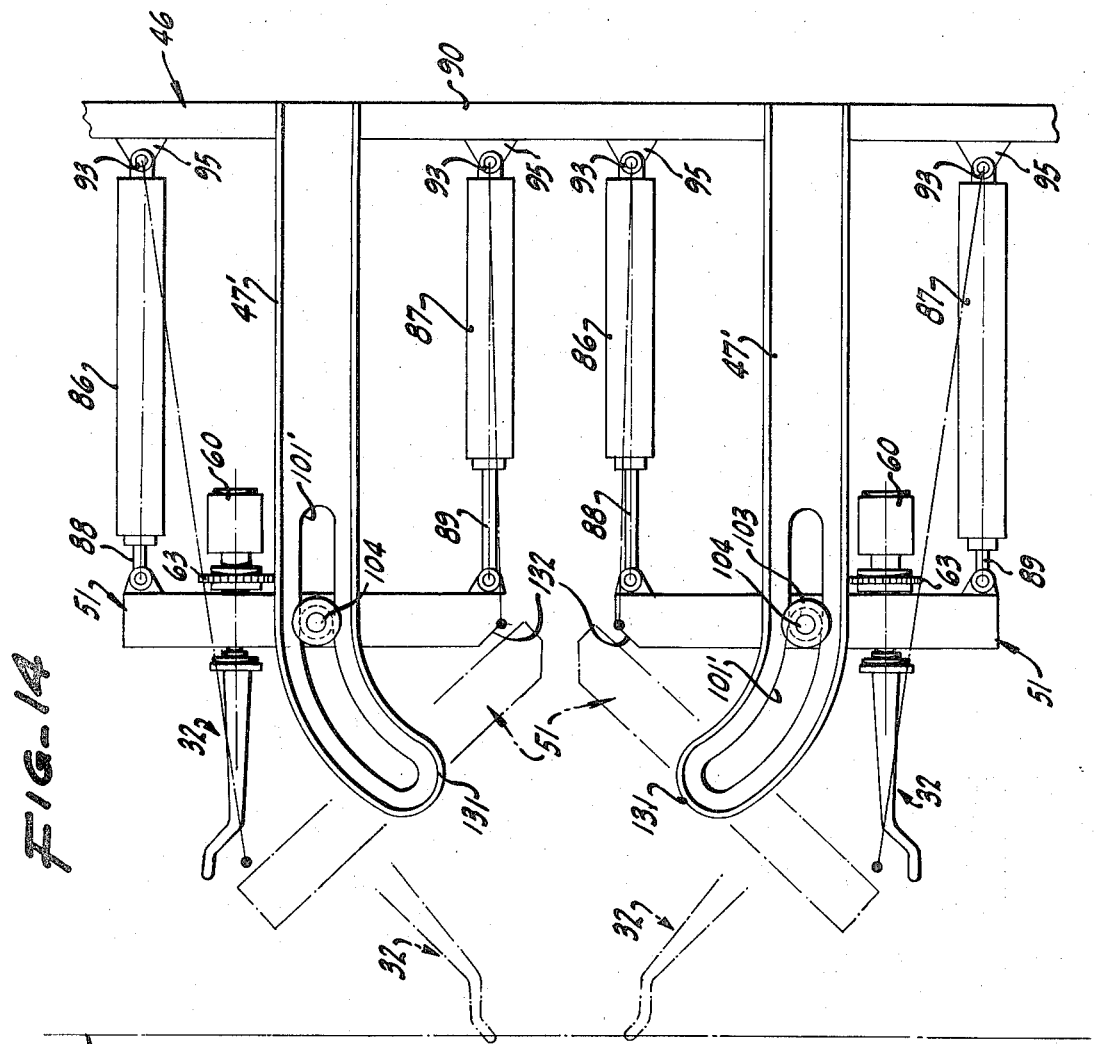
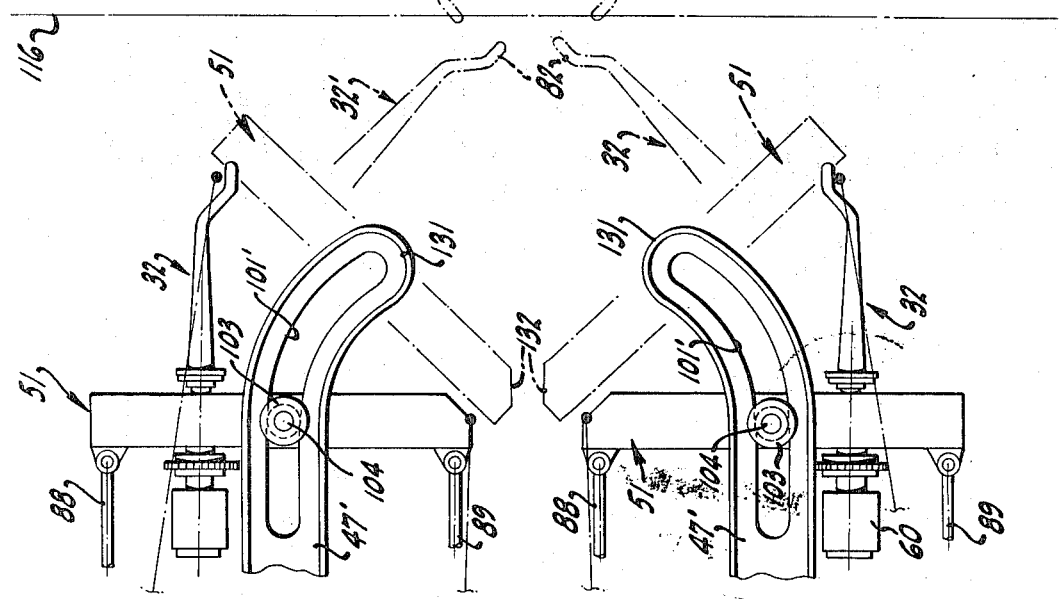
FIG-14

ROW CROP HARVESTING MACHINE

BACKGROUND OF THE INVENTION

1. Field of the Invention

This invention relates generally to the field of crop harvesting machines, particularly for crops which grow in rows. This invention relates more particularly to the field of fruit, nut or berry harvesting machines for picking agricultural products which grow on vines, bushes or trees, of which grapes, almonds, blueberries and coffee beans are exemplary.

More particularly, this invention relates to pneumatically picking or harvesting of grapes and like crops which grow in random fashion on vines or bushes. However, the subject machine also relates to the field of and has utility in conjunction with picking of crops, such as grapes, which are supported on trellis ports and wires in known fashion.

While hereinafter reference is directed particularly to the harvesting of grapes, and the illustrated machine is shown with particular reference to harvesting of such a row crop, it should be understood that the invention also relates to and has utility in conjunction with the harvesting or picking of other row crops, such as the exemplary nuts, berries and beans mentioned previously. Therefore, reference hereinafter and in the claims to the harvesting of grapes should be recognized and understood as including within its frame of reference the harvesting of other row crops which are amenable to picking or harvesting by a machine or apparatus of the type described herein.

2. Description of the Prior Art

The prior art contains numerous patents which disclose machines of various types for harvesting row crops of the types mentioned above. The prior art specifically contains various patents directed to machines for harvesting grapes. However, so far as is known, the prior art patents and available commercial machines concerned with picking grapes and like row crops do not possess the novel construction of the picking units or crop collection means of the present invention. As a result, such prior art patented machines and machines available on the market do not function in the novel manner described hereinafter.

Furthermore, despite the expenditure of large sums of money by numerous companies heretofore in developmental efforts directed to the production of an effective row crop harvesting machine, no fully effective or acceptable machine is commercially available.

Characteristic of prior known grape harvesting machines are the U.S. Pat. Nos. to Burton 3,360,913 dated Jan. 2, 1968; Shepardson 3,380,236 dated Apr. 30, 1968; Fox 3,473,311 dated Oct. 21, 1969; Olmo et al. 3,492,801 dated Feb. 3, 1970; and Sagouspe et al. 3,613,343 dated Oct. 19, 1971.

characteristic of the prior art relating to berry and like harvesting machines are Weygandt et al. 3,245,211 dated Apr. 12, 1966; McKibben 3,396,521 dated Aug. 13, 1968; Pertics 3,449,895 dated June 17, 1969; Ganger 3,485,027 dated Dec. 23, 1969; Grover 3,514,936 dated June 2, 1970; and McKibben 3,581,485 dated June 1, 1971.

While all of the prior art patents noted include various mechanical structures for separating row crops from their supporting vines, bushes or the like, as noted above none of such prior art mechanisms incorporates the particular structural features of the present invention and none functions in the particular fashion disclosed herein to effect separation of row crops in bunches or as separate berries or nuts from their supporting vines or limbs.

In that connection, the picking mechanism of the subject invention is specifically designed to insure effective entry of the picking arms of the respective picking units into the row crop being harvested and to separate the crop from the supporting vines or limbs even in the difficult to reach areas which were not effectively cleared of the row crop with prior known apparatus. As a result, the subject machine is capable of harvesting difficult to pick crops, of which grapes growing in random fashion on an untrellised vine or bush, are typical.

Because the picking units of the subject machine are selectively adjustable so that the axes of the picking arms may be oriented relative to the row crop at the picking angle of inclination most effective to insure complete harvesting of the crop, and because the picking units may be selectively reciprocated relative to the row crop while the picking arms are being rotated about their respective individual axes, effective crop harvesting is insured.

SUMMARY OF THE INVENTION

This invention relates generally to row crop harvesting machines. More particularly, this invention relates to a self-propelled machine designed to move along a crop row to be harvested so that the crop borne thereon may be effectively picked from the supporting vines, bushes or trees on which the crop is growing. Still more particularly, this invention relates to a crop harvesting machine having improved crop picking mechanism mounted on a self-propelled carriage in selectively adjustable fashion so that most effective crop harvesting can be insured.

Still more particularly, this invention relates to an improved row crop harvesting machine for picking difficult to pick row crops in effective fashion by utilization of improved picking arms which are rotatable about their respective axes, such arms possessing improved structural details designed to reach difficult areas of the crop rows heretofore generally unreachable by prior art picking mechanisms.

To that end, this invention further relates to the provision of improved picking units selectively mountable on a machine carriage in adjustable fashion so that the picking arms of such units may be most effectively oriented and actuated relative to the crop being picked. Furthermore, this invention relates to improved crop collecting means provided in conjunction with the picking units of the machine for gathering the crop severed from the supporting vines or bushes and for automatically transporting the same with minimum crop loss and accompanying debris to an associated gondola truck or trailer.

The present invention is believed to rectify difficulties inherent with prior known row crop harvesting machines in that the picking mechanisms of the subject machine are versatile in respect to their orientation relative to the crop being picked and in the function performed thereby during the picking operation.

From the foregoing, it should be understood that objects of this invention include the provision of an improved row crop picking machine; the provision of an improved self-propelled row crop picking machine effective for picking crops of varying types; the provision of an improved row crop harvesting machine utilizing improved adjustable and selectively orientable picking units therein; the provision in an improved row crop picking machine of advanced design picking arms constructed to effectively reach difficult to pick areas of row crops to be harvested; the provision in a row crop picking machine of improved mechanisms for selectively actuating picking arms for most effective crop harvesting; and the provision in a row crop harvesting machine of improved collection means for the crop being harvested These general objects of this invention, and other objects and features of the invention, will become apparent from a study of the following description of details of the subject machine in which reference is directed to the attached drawings.

BRIEF DESCRIPTION OF THE DRAWINGS

FIG. 1 is a front elevational view of the subject machine shown in conjunction with a row crop being harvested thereby.

FIG. 2 is a side elevational view of the subject machine taken in the plane of line 2—2 of FIG. 1.

FIG. 3 is a horizontal sectional view through the machine taken in the plane of line 3—3 of FIG. 1 illustrating the collection means for the crop harvested thereby.

FIG. 4 is a vertical sectional view through the crop collection means of the subject machine taken in the plane of line 4—4 of FIG. 3.

FIGS. 5 and 6 are vertical sectional views through a portion of the crop collection means of the subject machine taken in the planes of lines 5—5 and 6—6 respectively of FIG. 4.

FIG. 8 is a vertical sectional view through the subject machine taken in the plane of line 8—8 of FIG. 1 and illustrating details of the drive mechanism of one of the picking units utilized therein.

FIG. 9 is a vertical sectional view through a portion of a picking unit taken in the plane of line 9—9 of FIG. 8 and illustrating details of construction of the picking arms utilized therein.

FIG. 10 is a sectional view corresponding generally to FIG. 9 and illustrating details of a modified picking arm construction utilizable in a picking unit of the subject machine.

FIG. 11 is a sectional view taken in the plane of line 11—11 of FIG. 10 illustrating details of construction of a pivotal picking member utilizable in conjunction with the modified picking arm of FIG. 10.

FIG. 14 is a horizontal sectional view through a modified embodiment of the subject machine illustrating details of construction of a modified picking unit assembly utilizable therein, such figure corresponding generally to the illustration of FIG. 7.

DESCRIPTION OF THE PREFERRED EMBODIMENTS

Figure 7:
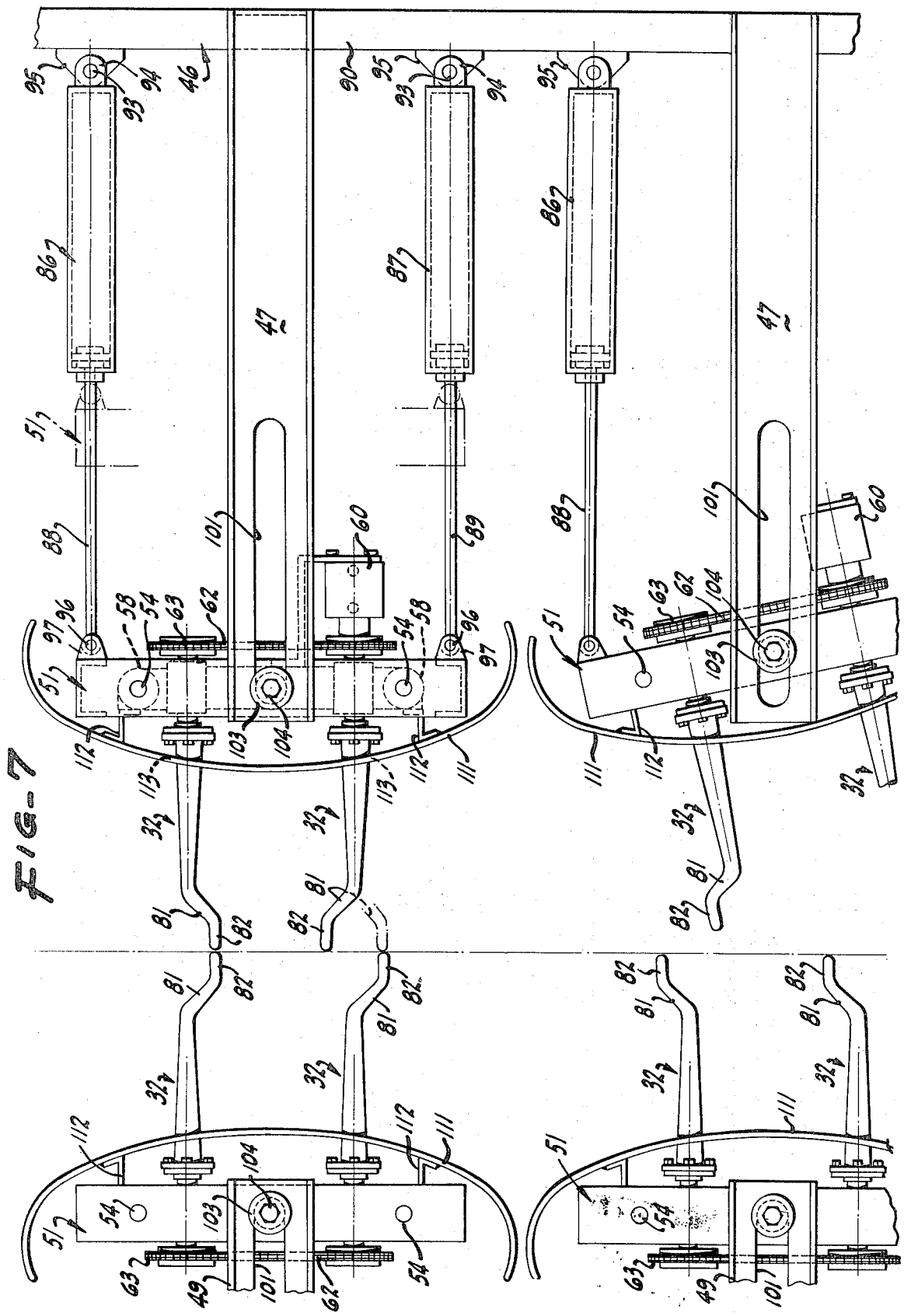
FIG. 7 is a horizontal sectional view through the subject machine taken in the plane of line 7—7 of FIG. 1 and illustrating details of construction of the crop picking unit assemblies utilized therein on an enlarged scale relative to FIG. 1.

Hereinafter in this description and in the appended claims, reference is directed specifically to the subject invention incorporated into a row crop harvesting machine designed for the harvesting or picking of grapes from vines or bushes. However, it should be understood that specific reference to a grape harvesting machine as contained herein is intended to include within its frame of reference and scope the picking of other row agricultural crops in addition to grapes, such as nuts, of which almonds are exemplary, and berries and beans, of which blueberries and coffee beans are exemplary.

That is, while the subject invention has particular utility in conjunction with and is described herein in conjunction with the harvesting of grapes which grow on vines or bushes in random fashion or on trellised vines supported by posts and wires, its utility in the harvesting of other fruits, berries and nuts which grow on bushes, trees or the like also is contemplated. Therefore, specific reference to the harvesting of grapes herein should be considered exemplary and is not intended to be limiting on the scope of invention incorporated into the subject machine.

Hereinafter, reference is directed to various embodiments of the subject machine and the picking unit assemblies and picking arm structures incorporated therein. However, as will be pointed out, each of such embodiments utilizes the basic novel concepts of the subject invention in which picking arms of a particular design are utilized for effective separation of grapes individually or in bunches from their supporting vines or limbs.

To that end, the subject invention is incorporated into a self-propelled machine which includes a movable carriage or chassis upon which all operative components of the picking apparatus are mounted and from which the collected grape crop is automatically transportable to an accompanying crop collecting vehicle, such as a gondola truck or trailer. Such collecting vehicle moves behind the harvesting machine (either self-propelled or drawn thereby) or moves between adjacent crop rows in accessible relationship to the machine so that the picked crop may be automatically deposited in such vehicle for transportation thereby to a harvesting plant, such as a winery, conveniently located relative to the vineyard being harvested.

Reference is directed to FIGS. 1 and 2 for a preliminary consideration of the subject machine and its various picking and crop collecting mechanisms.

In FIGS. 1 and 2, the subject machine, generally designated 1, is illustrated in conjunction with a row crop defined by parallel rows, each designated 2, of grape vines or bushes planted so that the respective trunks 3 thereof are in longitudinally spaced relationship along and define the center line of the crop row in known fashion. Grape vineyards frequently are cultivated so that the grape vines extend along the crop row and are supported by trellis wires which in turn are supported by trellis posts spacedly positioned along the crop rows. However, in the showing of FIGS. 1 and 2 the vineyard illustrated is not of the trellis type but rather is of the more difficult to pick type in which the grape bunches, designated 4, grow in random fashion from the vines or branches of the grape plant shown. Because of such random orientation of the grape bunches on their supporting vines or branches, the most difficult grape picking or harvesting situation is confronted. The subject machine has been designed to encounter and satisfy the picking requirements of such random grape growth.

To that end, the picking structure of the subject machine 1 is designed to straddle a given crop row in the manner seen in FIG. 1. While the illustrated machine straddles the crop row being picked, in alternate arrangements which would not depart from the inventive concepts hereof, the picking structure may be mounted in cantilever fashion to one side (or both sides) of a carriage moving between adjacent crop rows to be picked.

The machine preferably is self-propelled and comprises a carriage or chassis, generally designated 6, defined by an upper generally horizontal platform 7 from which depend and to which are secured by welding or other suitable fastening means front and rear laterally spaced wheel mounting columns, designated 8 and 9 respectively. Rotatably mounted on the lower ends of columns 8 and 9 are large pneumatic wheel and tire assemblies designated 11 and 12. The front wheel and tire assemblies 11 are mounted for turning about the vertical axes of the front supporting columns 8 in response to rotation of a steering wheel 13 positioned at a driver's station, generally designated 14, which includes a driver supporting seat 16.

The driver's station is supported upon the horizontal platform 7 which surmounts the carriage. The steering mechanism which links the steering wheel 13 with the front tire and wheel assemblies 11 may be of any conventional type and forms no part of this invention and therefore has not been illustrated in detail.

A power source for the machine, generally designated 17, is mounted upon platform 7 and may take the form of any internal combustion engine which is gasoline or diesel powered in known fashion. The power source 17 is operatively connected via a suitable drive shaft (not shown) with a gear box 18 positioned in overlying relationship with the rear wheel and tire assemblies 12 as seen in FIG. 2. A suitable chain drive, designated 19, extends between a conventional gear drive mechanism in gear box 18 and a drive shaft extending between and coupled to the rearwheel and tire assemblies 12 in known fashion, also as seen in FIG. 2. A control console 21 is positioned adjacent the driver's station and a series of control levers 22 to regulate the power source and other pneumatic and/or hydraulic operative components of the machine are positioned for ready access by the machine operator.

It will be noted from FIG. 1 that the wheel supporting columns 8 and 9 are laterally spaced in accordance with the spacing of the crop rows to be harvested by the machine. In the embodiment illustrated, the machine is designed to overlie or straddle one crop row while the laterally spaced wheel and tire assemblies 11 and 12 ride in the open areas lying on either side of the crop row being harvested.

The spacing between opposed lateral picking units, and the vertical orientation of the upper picking units of the subject machine to be described, may be modified depending upon the size of the grape vines or bushes being picked. In that regard, with random growth vines or bushes of the type shown, the height of such bushes may vary from 3 to 8 feet at time of picking while the width of such a row may range from 2 to 6 feet. Thus, the adjustability features of the picking mechanisms of this invention are important to adapt the machine to harvest vineyards having row crops of varying sizes.

As will be described hereinafter, the picking unit assemblies of the machine may be actuated in any suitable fashion, with pneumatic or hydraulic drive means being preferred. In that regard, combined pneumatic-hydraulic systems may be employed, although an entirely hydraulic system or entirely pneumatic system would normally be preferable for purposes of simplicity. However, either of the alternatives mentioned may be utilized as may be necessary to meet particular needs without departing from the spirit of the invention.

Because the utilization of pneumatic and/or hydraulic systems in conjunction with self-propelled vehicles of various types is well known, the details of such a pneumatic and/or hydraulic system utilized in the present machine has not been illustrated. It should be understood, however, that reference to the pneumatic or hydraulic system described hereinafter incorporates therein a suitable source of supply for pneumatic or hydraulic fluid, such as compressed air or hydraulic fluid to effect the operative functions to be described.

Still referring to FIGS. 1 and 2, it will be noted that a plurality of grape picking units or assemblies designated 26, 27 and 28 are provided along each of the opposed sides of the machine in adjustable fashion as will be described. In that connection, three such units are provided along each side of the machine in the illustrated embodiment. Two generally identical units, designated 29 and 31, are mounted above the crop row in similar adjustable fashion as will be described. The exact numbers of such picking units employed along the sides and overhead may be varied to meet particular picking requirements.

Referring to FIG. 1, it will be noted that the picking units along the opposite sides and top of the machine are positioned to have the picking arms 32 thereof substantially completely cover that portion of the grape vine or bush where the grapes are most commonly found. As will be described, the respective picking units are actuated by a combination mechanical-pneumatic or hydraulic drive mechanism. Each such picking unit preferably includes a plurality of picking arms 32, the construction and function of which will be described shortly. Such picking arms project inwardly of the respective picking units towards the crop row. The number and arrangement of the picking arms employed in each unit may be varied to meet particular picking requirements. In the machine illustrated, each picking unit includes six picking arms arranged in two parallel rows of three.

Supported along the base of the machine is the means for gathering the grape bunches or individual grapes removed from the crop row by the picking units. Such crop collection means is generally designated 36 and includes a suitable shaker or vibrator mechanism, generally designated 37. The shaker mechanism moves the grapes laterally of the machine and transfers the same to one side thereof where the grapes are deposited onto a horizontal conveyor mechanism, generally designated 38, which moves the grapes rearwardly of the machine and deposits them on an inclined second conveyor mechanism, generally designated 39, which elevates the grapes (FIG. 2) and transfers the same automatically into a third horizontal conveyor, generally designated 41. Such latter conveyor extends transversely of the machine and extends over an adjacent row crop as seen in FIG. 1 so that grapes carried thereon may be deposited into a collecting vehicle such as a gondola truck or trailer (not shown) travelling in an open area between adjacent row crops. In that regard, while the conveyor 41 in the illustrated embodiment is designed to transfer grapes laterally, it should be understood that the same may be positioned to extend rearwardly of the machine to transfer grapes into a truck or trailer following generally in the path of the harvesting machine.

Thus, with the machine illustrated, grapes are automatically picked, collected and transferred into a waiting trailer or truck for subsequent transport to a processing plant for conversion into wine or other grape products.

Reference is now directed to FIGS. 7 through 9 taken in conjunction with FIGS. 1 and 2 for details of construction of the respective picking units positioned along the opposed sides and top of the harvesting machine. In that regard, the machine incorporates a rigid framework, generally designated 46, which depends from the overhead platform 7 mentioned previously. Such framework is comprised of a series of metal channel members 47 which extend transversely relative to the top of the machine and are welded or otherwise secured beneath platform 7 as seen in FIG. 1. Welded or otherwise suitably secured to the outer ends of such transverse channel members are a series of upright channel members 48 which depend from the upper channel members 47 as best seen in FIG. 1. Extending inwardly from the lower extremities of the respective upright channel members 48 are a series of guide channel members, designated 49, the purpose of which will become evident. Thus the rigid machine framework 46 described provides means to support the respective opposed picking units 26, 27 and 28 in opposed relationship to each other.

The upper picking units 29 and 31 are supported by an upright metal framework extension, generally designated 46', which extends longitudinally of the machine and is defined by a series of welded or otherwise interconnected channel members 47' and 48' which extend transversely and longitudinally, and vertically, respectively, of the machine as perhaps best seen in FIG. 1. The inner vertical channel members 48' of the upper framework provide guide channels also for the purpose to be described.

As seen in FIG. 8, referring to the middle picking unit 27, and understanding that all picking units employed preferably are substantially identical so that only one need be described, such picking unit comprises a generally rectangular rigid frame 51 defined by welded or otherwise interconnected horizontal and vertical metal channels 52 and 53 respectively. Extending vertically within frame 51 in parallel relationship to the side channels 52 between top and bottom channels 53 are a pair of guide rods 54 held in place by suitable nut fasteners 56 positioned at the upper and lower extremities of the guide rods on the outer sides of the frame 51. Thus the rods are rigidly held in place and provide sliding guide surfaces over which the picking mechanism, generally designated 57, of the picking assembly is mounted.

Each picking unit includes a pair of elongated guide bearings designated 58 which surround the guide rods 54 and are adjustably movable thereon. In that connection, set screw type fasteners 59 extend through each of the guide bearings and, when such screw fasteners are tightened against the rods 54, the picking mechanism 57 is rigidly and securely held in the position of adjustment on rods 54 selected therefor. In that connection, referring to FIG. 2, it will be noted that the respective picking mechanisms of the picking units 26, 27 and 28 are located in different vertical orientations or positions so that the crop row being picked will be fully covered by the picking units on each side of the machine. That is, the adjustable mounting structure noted permits the orientation of the picking arms to be varied relative to the ground so that the arms may be selectively positioned for most effective picking, depending upon the size of the row crop being harvested.

As noted previously, although three picking units are provided on each side of the machine illustrated, more than or less than three units may be employed depending upon the nature of the row crop being harvested.

Secured between and extending between the guide bearings 58 is a mounting plate 61 which supports the operative components of the picking mechanism. In that connection, such plate supports a plurality of picking arms 32 mentioned previously which extend inwardly of the unit towards the arms of the picking units on the opposite side of the machine. In that regard, the embodiment illustrated comprises two parallel rows of vertically spaced arms 32, each row having three arms in alignment with each other. However, it should be understood that single rows having more or less than three arms, or more than two rows of such arms, may be utilized depending upon the nature of the row crop being harvested. The six picking arms 32 utilized in each picking unit in the embodiment illustrated have been determined to be satisfactory for most purposes however.

An important feature of this invention, apart from the particular configuration of each picking arm as will be described in detail hereinafter, is the fact that each such arm is selectively rotatable in predetermined fashion about its longitudinal axis by drive means provided at the base of the arm. In that connection, such drive means in the illustrated embodiment comprises an endless drive chain 62 which passes over a series of sprockets 63 each of which is rotatably mounted on a drive shaft 64 which extends through a bearing 65 positioned in enlarged bosses formed in the mounting plate 61 as perhaps best seen in FIG. 9. With the continuous chain drive shown, adjacent picking arms will rotate in opposite directions relative to each other as the chain is driven from a suitable power source.

In that connection, such power source preferably comprises a conventional pneumatic or hydraulic motor 60 mounted by means of a suitable bracket construction 66 bolted to the mounting plate 61 as seen in FIG. 8. Motor 60 is supplied by a supply conduit 67 connected with a suitable source of pneumatic or hydraulic fluid as noted previously. Preferably such motor 60 is of the type which is rapidly reversible in its drive directions in adjustable fashion so that the direction of rotation of the respective picking arms may be selectively, rapidly and repeatedly reversed as desired.

In that regard, it will be noted that the power shaft 60' of the drive motor 60 is operatively connected by bolts or the like with a sprocket 63 of one of the picking arms as seen in FIG. 9. Thus, upon actuation of the drive motor such sprocket 63 will be rotated either in a clockwise or counterclockwise direction and such rotation will effect driving of the chain 62 which in turn sequentially drives each of the other drive sprockets 63 in the series defining the picking mechanism.

As noted, the drive motor 60 is of the type which may be rapidly reversed automatically and sequentially so that rotation of the drive sprockets of the mechanism may be automatically effected in rapid sequence. Thus, the picking arms actuated by the drive sprockets may similarly be rotated first in a clockwise direction and then in a counterclockwise direction in rapid sequence.

In that regard, it is preferred that such rotation of the picking arms is alternated in opposite directions rapidly and repeatedly to prevent the grape vines encountered therewith from winding about or becoming fouled with the arms. Such reverse rotation in rapid sequence precludes such vine fouling which could inactivate the drive mechanisms or otherwise cause mechanical failure during the picking operation.

In that connection, the speed and degree of rotation of the respective drive sprockets and picking arms actuated thereby may vary to meet particular picking requirements. Rotation varying from one-half revolution up to two or three revolutions before reversal and driving in the opposite direction is effected may be utilized at speeds varying from ten to fifty rpms. The exact degree of rotation in alternate directions will be chosen in accordance with the nature of the crop being picked and the motor 60 used as a power source is capable of adjustable setting to effect the desired degree and speed of alternate rotation required.

In that connection, while it is preferred to reverse rotation as noted, under certain circumstances it may be desired, depending upon the nature and type of crop being picked, to continue rotation of the picking arms in a single direction rather than alternately reversing the rotation direction as previously described. The motor 60 also is capable of producing such continuous rotation if desired.

Referring to FIG. 9, it will be noted that the respective picking arms 32 are separably mounted on the picking unit by structure which permits such arms to be replaced as the same become worn or so that arms of different types or sizes may be substituted depending upon the type of row crop being picked. To that end, it will be noted that each drive shaft 64 on which a drive sprocket 63 is mounted has a keyway 68 at each of its opposite ends. The drive sprocket 63 is held in place on one end of the shaft 64 by a key positioned in the keyway and in a slot provided in the bore through the sprocket 63.

At its opposite end the shaft 64 receives a similar key which is utilized to couple a mounting boss 69 to the shaft. Such mounting boss is held in place by a washer and bolt assembly 71 threaded longitudinally into the shaft end and received in a recessed portion 72 of the boss to securely retain the same in non-rotatable relationship on the shaft. Each picking arm 32 is removably secured to the boss 69 by means of a mounting plate 73 having headed bolts 74 extending therethrough into threaded relationship with an enlarged flange portion 75 of the mounting boss.

It is an important feature of this invention that each picking arm possesses characteristics of flexibility and resiliency which permit the same to become engaged with the trunks, branches and vines of a row crop being picked without damage thereto. That is, the picking arms desirably are sufficiently flexible to effect a whipping type action on the row crop being picked to effectively remove grapes therefrom.

To that end, each picking arm is defined by a nonmetallic elongated tapered body 76 of suitable material, such as sturdy rubber, polyvinylchloride, a tough plastic such as nylon, or the like. If desired, the surface of the picking arm body may be roughened to enhance picking. However, a generally smooth body is normally preferred to prevent fouling of the picking arm with the row crop vines or branches. To impart strength and resiliency to the picking arm, a central metal core member 77 extends longitudinally of the body and the material of the body is bonded in secure fashion to the core member 77. The core member is formed from any suitable metal rod or bar which is bendable and resilient as noted. At its inner end the core member is provided with an enlarged head 78 which is seated in a recess 79 formed in the inner surface of the mounting plate 73. Thus, by means of the engagement of the enlarged head with the mounting plate and bonding of the end of the non-metal picking arm body to the mounting plate, separation of the picking arm from the mounting plate is positively precluded.

To supplement the desirable flailing or whipping action which characterizes the function of the subject picking arm as the same rotates, and to insure effective crop picking therewith, the outer or nose end of each arm is provided with an offset or dog-leg portion 81 which is formed as an integral continuation and extension of the main body portion 76 of the picking arm. Extension 81 projects from the body of the arm at an angle relative to the longitudinal axis thereof which may fall within the range of 20° to 45° for best results. It is normally not necessary for the metal core member 77 to extend into the extension 81. However, under certain circumstances, it may be desirable to have the core entend into the extension depending upon the nature and type of crop being picked. In any event, the offset extension terminates in a tip 82 which extends generally parallel to the axis of the main body of the picking arm.

When the picking arm rotates in alternate directions as described previously, the offset extension rotates in eccentric fashion relative to the axis of the arm and whips or flails bunches of grapes from their supporting vines or branches as the same comes in contact therewith. It should further be understood that because of the flexibility of the arm, and depending upon the speed at which it is rotated, the entire arm may move or wobble in an offset path about its mounting axis, due to centrifugal forces, which further enhance the flailing or whipping action of the arm.

It will be noted from FIG. 9 that, because all picking arms in a single unit preferably are driven from a single power source through the chain drive noted that adjacent arms will rotate in opposite directions. Such opposite rotation relative to each other further enhances the picking action of the picking unit. It should further be understood that the offset extension 81 of the picking arm enhances effective picking in that such extension permits the arms to enter behind branches or portions of trunks of the vines with which the picking arms come into contact so that grapes which might otherwise be inaccessible to a conventional picking machine may be harvested.

As noted previously, the respective picking units positioned on opposite sides of the machine are generally in alignment with each other and are initially positioned so that opposing picking arms (as best seen in FIG. 7) are oriented when in the rest position so that the outer offset extensions 81 thereof are in substantial contact with each other. Because of the flexible and resilient nature of the materials from which the arms are formed, should such extensions come in contact with each other during rotation thereof, damage will not be the result.

By having the offset extensions in close proximity when the arms in the rest position as seen in FIG. 7, assurance is had that substantially the entire crop to which the picking arms are exposed will be covered by the picking action thereof. Referring in that same regard to FIG. 1, it will be noted that the overhead picking units 29 and 31 are constructed similarly to the picking units just described with their picking arms 32 extending downwardly to effect picking of any grapes which are positioned near the top of the vines or bushes being picked out of the reach of the opposed side picking units.

An important advantage of this invention resides in the fact that picking units of the same construction may be used on the opposed sides of the machine as well as in the overhead orientation shown in FIG. 1. Thus, entire units may be substituted for one another in a given machine to effect thorough picking of a given row crop depending upon its characteristics.

Under certain circumstances, it is contemplated that the picking arms would not be movably mounted relative to the row crop during a picking operation, relying only upon the rotation and picking action of the picking arms to effect severance of bunches of grapes from their supporting vines. Under such circumstances, it is contemplated that the picking arms normally would be angularly oriented (in the manner to be described) relative to the center line of the crop row being picked.

However, under most circumstances, it is contemplated that the picking arms will be reciprocated in and out relative to the row crop being picked in conjunction with rotation thereof about their individual axes. Such in and out reciprocation is effected to minimize damage to the picking arms, to permit ease of entry and removal of the picking arms into the innermost portions of the vines or bushes being picked as the machine moves over the row crop, and to insure thorough picking of substantially all grapes from the crop. To that end, means for effecting reciprocation of each picking unit and the plurality of picking arms carried thereby as an entity is provided in conjunction with each of such units.

Such reciprocating drive means preferably is pneumattically or hydraulically actuated from the aforementioned pneumatic or hydraulic fluid source. In either event, each such reciprocating drive means comprises a pair of conventional fluid cylinders designated 86 and 87 on each picking unit, including those units mounted overhead of the machine. The function of such cylinders, as seen in solid and dotted lines in FIG. 7 is to effect extension and retraction of the picking units as a single operative unit relative to the framework 46 of the machine and relative to the center line of the row crop. It will be understood that upon introduction of a suitable driving fluid against one end or the other of the piston (not shown) contained within the cylinders 86 and 87 that the respective piston rods 88 and 89 connected with such pistons will be selectively extended or retracted relative to the piston bodies.

Because the piston construction illustrated is conventional and well known in the pneumatic and hydraulic fields, details of construction thereof are not disclosed. It should be understood, however, referring to FIG. 1, that each of the pistons is actuated via conduits 91 and 92 which selectively introduce and remove driving fluid relative to opposite faces of the piston within the cylinder. By rapidly introducing and removing fluid from contact with opposite faces of the piston, the piston rod connected therewith may be rapidly extended and retracted to effect in and out reciprocation of the picking units and the picking arms carried thereby relative to the center line of the row crop being picked.

To permit mounting of each pair of cylinders 86 and 87 in operative position relative to the picking unit associated therewith, the framework 46 of the machine is provided with a longitudinally extending frame member 90 which is secured by welding or the like between the upright frame members 48 mentioned previously. Mounting plates 95 are welded or otherwise secured to the inner side of the frame member 91 and the associated cylinders are pivotally mounted thereon by means of pivot pin 93 and eye extension 94 which is secured to the outer end of the respective cylinders. Thus, it will be understood that the cylinders are pivotal relative to the mounting plates 95 as may be required during a picking operation. At their free outer ends, each of the piston rods 88 and 89 is similarly pivotally connected to the picking unit frame 51 by means of pivot pins 96 and eye extensions 97 secured to the side frame members 52 of the picking unit frame.

Thus, it will be understood that as the piston rods 88 and 89 are extended in unison or retracted in unison the picking unit and the picking arms carried thereby may be extended between the dotted line and full line positions shown in the upper portion of FIG. 7. Because rotation of the picking arms 32 is effected by means of the pneumatic or hydraulic motor 60 mentioned previously which is connected with a pneumatic or hydraulic source through a flexible hose conduit, such extension or retraction may be effected without interferring with rotation of the picking arms as described previously.

Of course, it should be understood that guide means is required to maintain the picking unit in proper orientation during in and out reciprocation thereof. Such structure includes guide structure at the upper and lower extremities of each picking unit frame. Such guide structure is defined by the aforementioned machine framework channel members 47 and 49 which extend inwardly from the sides of the machine framework as seen in FIG. 1. Such frame members, as seen in FIG. 7, are provided with elongated slots 101 extending longitudinally thereof from adjacent their outer end for a substantial distance towards the outer side members of the framework. Such slots 101 define guide paths for the picking units which determine the direction in which the picking units will move.

The picking units are mounted in each frame member for longitudinal sliding movement therein by means of a bearing member 102 (which may be rotatable if desired) which is held in place by an enlarged washer 103 and threaded bolt 104 as seen in FIG. 8. Preferably a spacer plate 106 is interposed between the respective channel members 53 of the picking unit and the inner planar surface of the frame members 47 and 49. Thus, with the guide means described, each picking unit is reciprocably mounted relative to the machine for in and out movement as described. In that regard, it will be noted from FIG. 2 that a similar mounting arrangement, generally designated 107, is shown in dotted lines in such figure for use in mounting and guiding the overhead picking units 29 and 31 for up and down reciprocation as described previously.

It should further be understood that it is a relatively simple matter to remove picking units from a given machine by removing bolts 104 and by separating the drive cylinders by removing either of the pivot pins 96 or 93 at the respective ends thereof so that the unit may be removed from the machine in toto. Thus, a different type or size of unit may be substituted in the machine depending upon the type of crop to be picked. In that regard, the spacer plates 106 interposed between the picking unit and the frame members 47 and 49 may be increased or decreased in size to properly adapt a given unit for insertion into a given machine.

To prevent fouling of the grape vines or branches with the rotation producing mechanism for the picking arms 32, preferably deflecting means in the form of metal shields 111 are secured by welding to Z-shaped mounting brackets 112 similarly secured by welding to the outer surface of the respective picking units as best seen in FIG. 7. Such metal deflecting shields are curved and provide bumpers or guides to maintain the grape vines or branches away from the inner working mechanisms of the rotatable picking fingers 32. To that end, the picking fingers extend through suitable openings provided in the deflecting members 111 and designated 113 as seen in FIG. 7. Because the deflecting members 111 are secured directly to the picking units, they are automatically adjustably positioned with the picking units in the manner described previously.

A further important feature of the subject machine is its ability to orient the picking arms 32 of the respective picking units at a wide variety of picking angles relative to the particular crop row being harvested. That is, the picking arms may extend with their axes generally normal to the center line extending through the picking row, such center line being disignated 116 in FIG. 7 for purposes of illustration. Alternatively, such picking arms may have their axes oriented to extend at any predetermined angular orientation relative to such row center line, either in the direction of movement of the machine or opposite to such direction of movement. The amount of angular orientation chosen is selected, as is the direction of such orientation, in accordance with the characteristics of the particular crop being harvested.

Referring to the lower right hand portion of FIG. 7, an illustration is provided which shows the nature in which the angular orientation of the picking arms may be selectively modified without altering the ability of the picking arms to rotate about their respective axes or to reciprocate in and out relative to the row crop. In that regard, with pneumatic or hydraulic cylinders 86 and 87 of the type noted, it is possible to selectively extend the piston rod of one cylinder while selectively retracting the piston rod of the other cylinder. By extending a piston rod 88 as shown in FIG. 7, while the opposite piston rod 89 is retracted, the picking unit 51 is pivoted about its vertical axis defined by the bolts 104 which hold the picking unit in position as described previously. Such selective extension and retraction of the opposed piston rods 88 and 89 positions the picking arms at an angular orientation relative to the row crop center line 116 as seen in FIG. 7. Such angular orientation is effected before reciprocation of the picking unit is effected. That is, it should be understood that the respective piston rods are initially selectively extended and retracted as noted and thereafter such piston rods are extended and retracted in unison and to the same degree so that the picking unit is reciprocated in and out relative to the row crop center line while maintaining the angular orientation of the picking arms previously selected. Thus, most effective picking for a given row crop may be effected and entry and retraction of the picking arms into a grape vine may be facilitated as the machine moves along the row crop.

The angular positioning procedure described may be reversed when it is desired to orient the picking arms in the direction opposite to that shown in FIG. 7. The amount of angulation of the arms 32 in either direction may vary as required but exemplary angles within the range of 10° to 30° relative to the axes of frame members 47 and 49 are normally acceptable.

The control console 21 and the control levers 22 mentioned previously are operatively connected with the respective pneumatic or hydraulic cylinders for effecting angular positioning and other operation thereof as described previously. It should be understood that reciprocation of the picking units is continued automatically so long as the controls introduce fluid alternately against opposite faces of the pistons in cylinders 86 and 87.

It should also be understood that various modifications of the picking arm construction may be effected to prepare such picking arm for harvesting crops of various types. One such modification is shown in FIGS. 10 and 11 in which a modified picking arms 32' is provided with a flexible metallic core 77' of the type noted previously. However, the picking body 76' is formed in the illustrated embodiment with a peripheral elongated longitudinally extending recess 117 in which is positioned a freely rotatable metallic (such as stainless steel) or nonmetallic (such as rubber or nylon) sleeve 118. Such sleeve extends for substantially the full distance of the main body portion of the picking arm and its function is to further insure against the catching or binding of grape vines or branches with the picking arm as the same rotates in a continuous direction or in alternate directions as described previously. That is, as the picking arm rotates, the sleeve is free to rotate in the same direction or in the alternate direction relative to the direction of axial rotation of the picking arm to prevent fouling of the picking mechanism.

In an alternate but related embodiment not shown, a sleeve of the type described may encircle the picking arm and such sleeve may be fixed against rotation in any suitable fashion by securing the same to the mounting plate 61. In such arrangement, the picking arm will rotate within the sleeve but the sleeve will be precluded from rotation in a manner which also has been determined will preclude fouling of the mechanism as the picking arm rotates relative to the grape vines or limbs.

A further embodiment and modification of the picking arm construction provided to further enhance picking of grapes is shown in FIGS. 10 and 11. Such embodiment is provided in conjunction with the offset extension 81' of the modified arm shown in FIG. 10. Such modification includes auxiliary extensible picking elements, one or more in mumber, which preferably are pivotally connected to extend generally radially outwardly from the axis of the picking arm as the same rotates.

That is, such auxiliary picking elements, which preferably are two in number as shown in FIG. 10, constitute pivotal extensions of the main body of the picking arm and are defined by flexible yet substantially rigid mallet members 119 and 121 which are pivotally hinged by means of pins 122 to a mounting plate 123 which extend laterally through the main body portion of the picking arm 32' adjacent its lower end. Such pins extend through mounting plate 123 which preferably is formed integrally with or is otherwise operatively secured to the metal core member 77' of the picking arm adjacent its outer end as perhaps best seen in FIG. 11.

Thus, the mallet members 119 and 121 are free to pivot about the axes of pins 122 toward or away from the offset portion 81' of the picking arm. Upon rotation of the picking arm, centrifugal force will tend to urge the mallet elements to the fully extended position shown in FIG. 10. However, upon reciprocal in and out movement of the picking arms relative to the row crop as described previously, such mallets are free to pivot to the dotted line position shown to preclude fouling with the grape vines or branches of the row crop being harvested.

The mallet elements 119 and 121 may be formed with various configurations to suit the needs of the particular crop being harvested. However, it has been determined that projections provided along the length thereof are desirable to enhance picking. To that end, intermediate their opposite ends each of such mallets may be provided with protuberances of any suitable configuration, such as the rounded beads or ridges 124 shown in FIG. 11.

Similarly, it has been determined that the outer ends of the respective mallets may effectively be provided with tapered enlargements or heads 126 which assist in removing grape bunches from their supporting vines or branches. Such heads preferably include relatively sharp edges 127 which tend to sever grapes in bunches from their supporting vines or branches. The exact configuration of the protuberances or heads formed on the respective picking elements may vary to meet particular needs.

The dimensions of the picking arms 32 or 32' chosen in conjunction with a particular machine also may vary depending upon the nature of the crop being harvested. Such arms may vary in length from as little as 3 inches to as much as 24 inches or more in length. Their thickness may vary proportionally with their length within limits which may readily be determined by picking experience. However, by way of example and referring to the illustrative showing of FIG. 9, a maximum thickness of approximately one-fifth the length of a given arm, with a gradual taper as shown, amy be utilized as a general principle.

Before describing the crop collection means preferably utilized in conjunction with the subject machine, reference is directed to FIG. 14 for a description and illustration of a further embodiment of the picking unit construction described previously. In that regard, the same basic arrangement shown in FIG. 7 is utilized with the opposed picking units being identified by the same reference numerals previously mentioned with such picking units including the aforementioned means for simultaneously rotating the picking arms 32 and reciprocating the picking units in and out as desired or required to effect picking of a given row crop.

However, with the modification shown in FIG. 14, the picking units are constructed so that the picking arms 32, while the same are rotating about their respective axes, may be reciprocated inwardly or outwardly relative to the center line 116 of the crop row in a curved path at an angle which increases as the picking units are extended. That is, in the embodiment of FIG. 14, the picking units reciprocate in a curvilinear path in distinction to the straight line path of the embodiment of FIG. 7.

Additionally, adjacent picking units are extended angularly in the direction towards each other as shown by the dotted line illustration of the picking arms in FIG. 14. To effect such increasing angular extension, the supporting frame members 47' and 49' (the latter not being illustrated in FIG. 14) are formed with an outer selectively curved or arcuate end 131. In the illustrated embodiment, each such arcuate outer end is directed towards a similarly contoured outer end of an adjacent frame member provided at the same side of the picking machine.

The longitudinally extending guide slot 101' follows the curved configuration of its associated frame member as also noted in FIG. 14. Thus, upon extension of the picking unit by actuation of the cylinders 86 and 87 associated therewith, the picking unit carries the picking arms 32 in a curvilinear path from the solid line position to the dotted line position shown in FIG. 14. Such curvilinear path of movement has the effect of moving the picking arms of adjacent picking units towards each other while at the same time moving such picking arms generally in a grabbing or scissors fashion relative to the picking arms of the opposed picking units as seen in dotted lines in FIG. 14.

To effect such curvilinear movement of the picking units, the respective pistons 86 and 87 which lie closely adjacent each other in FIG. 14 are extended only a minimal amount while the outer lying pistons 86 and 87 are substantially extended to permit the picking unit to move in the curvilinear path noted. In that regard, it should be understood that the pistons of the respective cylinders may be extended unequal amounts by preadjusting the flow of fluid to the pistons therein in fashion well known in the pneumatic or hydraulic art.

With the arrangement shown in FIG. 14, it has been determined that the picking units most effectively operate in cooperable pairs as illustrated and if such embodiment is incorporated into a given machine the picking units employed along opposite sides of the picking machine should be utilized in multiples of two for most effective picking. It should also be noted with the arrangement shown in FIG. 14 that the pivotal connection of the respective cylinders about the axes of pivot pins 93 permits the curvilinear motion described.

To preclude interference between adjacent edges of the framework of the respective picking units, each such framework may be beveled as shown at 132 to preclude contact between adjacent picking units as the same are in their full extended position.

As noted previously, the grapes, in bunches or individually, which are picked by the picking units described previously are allowed to fall under the influence of gravity toward the bottom of the machine where means for collecting the crop harvested is provided. Such collection means is generally designated 36 and is reciprocably mounted adjacent the bottom of the machine in depending relationship from the framework 46 thereof generally centrally of the machine between the front and rear wheel and tire assemblies 11 and 12.

The crop collection means includes opposed reciprocal sections, which collectively are identified by numeral 37 and which individually are identified by reference numerals 136 and 137, which lie on opposite sides of the trunks 3 of the crop row being harvested as best seen in FIG. 3.

The sections 136 and 137 are generally similarly constructed and each is formed in a plurality of two or more longitudinally spaced segments designated 138, 139, 140 and 141 in FIG. 3. Each of such segments, as will be described, is operable as a separate unit relative to adjacent and opposed segments but all such segments cooperate and function in unison to effect maximum crop collection with minimum loss or crop damage. It should be understood that each segment of each section of the crop collection means is reciprocal relative to the trunks 3 of the row crop in the direction of the double headed arrows shown in FIGS. 3 and 4. Such reciprocation is effected by mechanism to be described provided in conjunction with the means for mounting the crop collecting means beneath the aforementioned frame members 49. Such latter mentioned means is best shown in FIG. 4.

As noted from FIG. 2, each section of the crop collecting means at opposite sides of the machine may be defined by more than the two previously mentioned segments 140 and 141 thereof and in the embodiment illustrated in FIG. 2 four such segments, each of which is operable separately from its adjacent segments, are provided. The number of such segments utilized may vary in accordance with the needs dictated by the particular crop being harvested.

As seen in FIGS. 2, 3 and 4, extending along opposite sides of the machine and secured by welding or the like between the aforementioned frame members 49 are opposed longitudinally extending frame members 146 and 147 respectively, the purpose of which will become evident shortly. Each of the segments of the two opposed sections of the crop collecting means is substantially identical and therefore the leading segments 138 and 140 as seen in FIGS. 3 and 4 will be described. The following segments in the series are substantially identical in all important respects to the segments described and similar reference numerals are utilized in the drawings to identify corresponding components of such segments.

Each segment 138 and 140 is mounted for generally horizontal reciprocation relative to the center line 116 of the row crop being traversed by the machine. In that regard as best seen in FIG. 4, each such segment includes a stepped riffle plate 151 and 152 respectively. Each such riffle plate is formed from any suitable sturdy material capable of withstanding the wear and tear to which the crop collecting means is subjected, and a suitable sheet metal, such as stainless steel, may be employed. Each such riffle plate is supported on a planar base plate 153 and 154 respectively to which the riffle plate associated therewith is secured by welding or the like. Thus, the respective riffle plates form a generally hollow sheet metal body structure with their respective base plates as best seen in FIG. 4.

The respective riffle plate structures are supported beneath the aforementioned frame members 49 by means of opposed pairs of pivot mounting links 156, 157, 158 and 159 mounted along opposite sides of the respective riffle plates as seen in FIGS. 3 and 4. To that end, pairs of pivot pins 161 and 162 extend through the respective pivot links and secure the respective riffle plates for pendulum type swinging reciprocal motion beneath the frame members 49. The lower ends of the respective pivot links are secured by second pairs of pivot pins 163 and 164 respectively to mounting bracket structures 166 and 167 secured to the bottom of the respective riffle plates also as seen in FIG. 4.

Mechanism to effect rapid reciprocation or vibration of the riffle plates 151 of segment 138 is shown in FIGS. 4 and 6 and comprises a pneumatic or hydraulic cylinder structure generally designated 171 which is secured by means of a mounting bracket 172 beneath a longitudinally extending mounting bar 173 which extends beneath and is fixed to the framework which supports the riffle plates. The piston rod 174 of cylinder 171 is secured at its free end by a suitable bolt and nut connection with a drive plate 176 secured by welding or in other suitable fashion to the undersurface of the base plate 153 of the riffle plate structure. Thus, upon extension or retraction of the piston rod 174, the riffle plate 151 will be moved laterally inwardly and outwardly relative to the row drop being harvested in the direction of the double headed arrows shown in FIG. 4.

A suitable pair of inlet and outlet conduits in the form of hose connections 177 and 178 are provided to introduce pneumatic or hydraulic fluid into contact with opposing faces of the piston within cylinder 171 in alternate fashion to effect rapid reciprocation of the piston rod 174 and the riffle plate operatively connected therewith within predetermined limits.

With respect to the opposite segment 140 and its riffle plate 152, a similar pneumatic or hydraulic piston assembly 179 is mounted beneath the riffle plate structure in the same fashion noted so that a piston rod 181 thereof may be rapidly reciprocated or vibrated inwardly and outwardly relative to the row crop being harvested during operation of the machine.

With the arrangement shown, it should be understood as seen in FIG. 4 that grape bunches or individual grapes which are deposited on the various segments of the crop collecting means shown will be urged under the reciprocating vibrating motion of the respective riffle plates towards the right in FIG. 4 to be collected at one side of the machine as will be described. If desired, the respective riffle plates may be inclined downwardly from the left side towards the right side of FIG. 4 to further assist in movement of the picked grapes which are deposited on the riffle plates.

If desired, curved sheet metal deflector members 180 may be mounted on the inner ends of frame members 49 as seen in FIGS. 3 and 4 (by bolting, welding or the like) to prevent fouling of the mechanism provided to effect reciprocation of the riffle plate segments provided on the right side of the machine as seen in those figures. If desired, similar deflectors may be provided in conjunction with the riffle plate segments on the left side of the machine also.

In the embodiment illustrated, while there is a gap 182 present between the opposing segments of the crop collection means as seen in FIG. 3 to accommodate the trunks of the grape vines or bushes being harvested, it should be understood that such gap is relatively narrow and that the reciprocating motion of the respective riffle plates is sufficient to urge the grape bunches or individual grapes to traverse the gap without substantial loss therethrough. Additionally, as noted in FIG. 4, the segments of the crop collecting means lying to the right of the machine are at a lower vertical level than are the segments lying to the left of such machine so that such vertical offsetting further assists in precluding crop loss through the gap 182.

As seen in FIG. 3, to assist in insuring that the trunks 3 will properly enter the slot between the segments of the crop collecting means, guide members 186 and 187 are formed from lengths of sheet metal of suitable strength and rigidity to withstand contact with the trunks of the crop row being harvested. Such guides extend longitudinally of the segments of which they form a part and are formed with diverging nose portions as seen in FIG. 3 to facilitate the entry of trunks 3 therebetween.

Recognizing that the thickness of such stumps may vary, mechanism is provided in conjunction with each of the segments of the collection means to permit lateral outward movement of opposed segments relative to each other during passage of a machine over a row crop. Such mechanism in the embodiment illustrated comprises spring structure, generally designated 191 and 192 respective in FIG. 3, for the respective opposed segments. Such spring structure as seen in FIG. 4 constitutes a plurality of leaf springs joined together in leaf spring assemblies 193 and 194 respectively, such leaf spring assemblies being secured by nut and bolt connectors 196 and 197 respectively to the aforementioned frame members 146 and 147 which extend longitudinally of the machine.

The lower ends of the depending spring assemblies 193 and 194 are in frictional contact with outer extensions of the riffle plate structure designated 196 and 197 respectively in FIG. 4. Thus, upon the driver of the machine being unable to keep the machine on a true center line as the same passes over a row crop, or upon unusually thick trunks 3 being contacted, the respective riffle plate structures of the respective segments may move laterally away from each other against the urging of the spring assemblies 193 and 194 until the condition encountered is corrected at which time the spring assemblies will urge the riffle plate structures back into their normal positions.

The crop collection means of the subject invention has a further important feature which is illustrated in FIG. 4 which comprises structure for assisting in moving grapes deposited upon the riffle plate 151 across the gap 182 onto riffle plate 152. Such structure further assists in separating unwanted debris, such as leaves and bits of vines or branches, from the grape crop being harvested. In that regard, beneath the riffle plate 151 as seen in FIG. 4, is provided a hollow preferably non-metallic (such as rubber, polyvinylchloride or nylon) pneumatic chamber generally designated 201 which extends longitudinally the length of its associated segment. Air under pressure is supplied through a hose connection or conduit 203 to the chamber 201 in the manner seen in FIG. 1. Thus, upon entering through the hose connection in each of the segments as shown in FIG. 3, the air emanates from the open mouth of the unit generally designated 204 in FIG. 4. Directional louvers or guide vanes 202 are spacedly mounted in the mouth of the chamber as seen in FIG. 3.

Air under substantial pressure is thus blown across the gap 182 between the opposed segments of the crop collection means in the manner seen in FIG. 4 to assist grapes to cross the gap between such opposed segments and, also importantly, to blow leaves, branches and bits of vine (designated by the reference numeral 206) upwardly and away from the grapes which have been harvested. Because the framework of the machine is generally open as noted from the attached drawings, such leaves, vines and braches may be blown generally away from the grapes so that the need to separate unwanted debris from the grapes to be pressed is minimized.

Referring now to FIGS. 2, 3 and 4, the crop collecting means further includes mechanism for transporting the grapes harvested to a collecting station, such as a gondola truck or trailer positioned as described previously. Such transfer means in the embodiment illustrated comprises the aforementioned conveyor 38 which extends longitudinally of the machine internally of the wheel and tire assemblies thereof as seen in FIG. 2. Such conveyor includes an elongated housing 206 which is secured by welding or the like beneath the framework utilized to support the riffle plate segments which lie on the right side of FIG. 4. Such housing forms support bearing surfaces for a plurality of conical conveyor rollers 207 which extend internally of the housing between opposite walls thereof as seen in FIG. 4.

An imperforate non-metallic belt 208 of any suitable material such as nylon is engaged with and supported by the conical rollers 207 in the manner seen in FIG. 4 so that grapes deposited thereon, and any free running juices which accompany the grapes, will be received in a trough-like channel defined by the upper reach of the belt as the same moves from adjacent the front end of the machine towards the rear end thereof with reference to FIG. 2.

Such conveyor belt 208 is driven by means of the aforementioned cooperable angled conveyor mechanism 39 through a conventional sprocket-chain drive mechanism generally designated 209 in FIG. 2. The conveyor mechanism 39 extends generally upwardly from adjacent the rear end of the machine and in turn is driven by a drive chain 211 operatively connected with the main gear box 18 in known fashion. Thus, upon conveyor 39 being driven, conveyor 38 is simultaneously driven so that grapes deposited on the belt 208 of conveyor 38 will be transported to and deposited upon conveyor 39.

In known fashion, conveyor 39 is an elevating conveyor which may be formed with a configuration generally the same as that described with respect to conveyor 38. However, to permit elevation of grapes and free juices which may be deposited thereon, the belt of conveyor 39 preferably is provided with closely spaced baffle plates (not shown) which elevate the grapes towards the aforementioned horizontal conveyor 41 by means of which the grapes are delivered to a waiting gondola truck or trailer moving in conjunction with the harvesting machine. In that regard, conveyor 41 may possess the same structure as conveyor 38 and it should be understood that grapes and juices elevated by conveyor 39 may be deposited into the housing surrounding conveyor 41 for movement laterally to a gondola truck or trailer described.

Because conveyor mechanisms of the type shown generally at 38, 39 and 41 have been known heretofore, their operation and interrelationship to effect transfer of grapes and any associated juices therewith has not been described in detail. However, such mechanisms are well known within the art to persons engaged in the harvesting of agricultural products.

Figure 12:
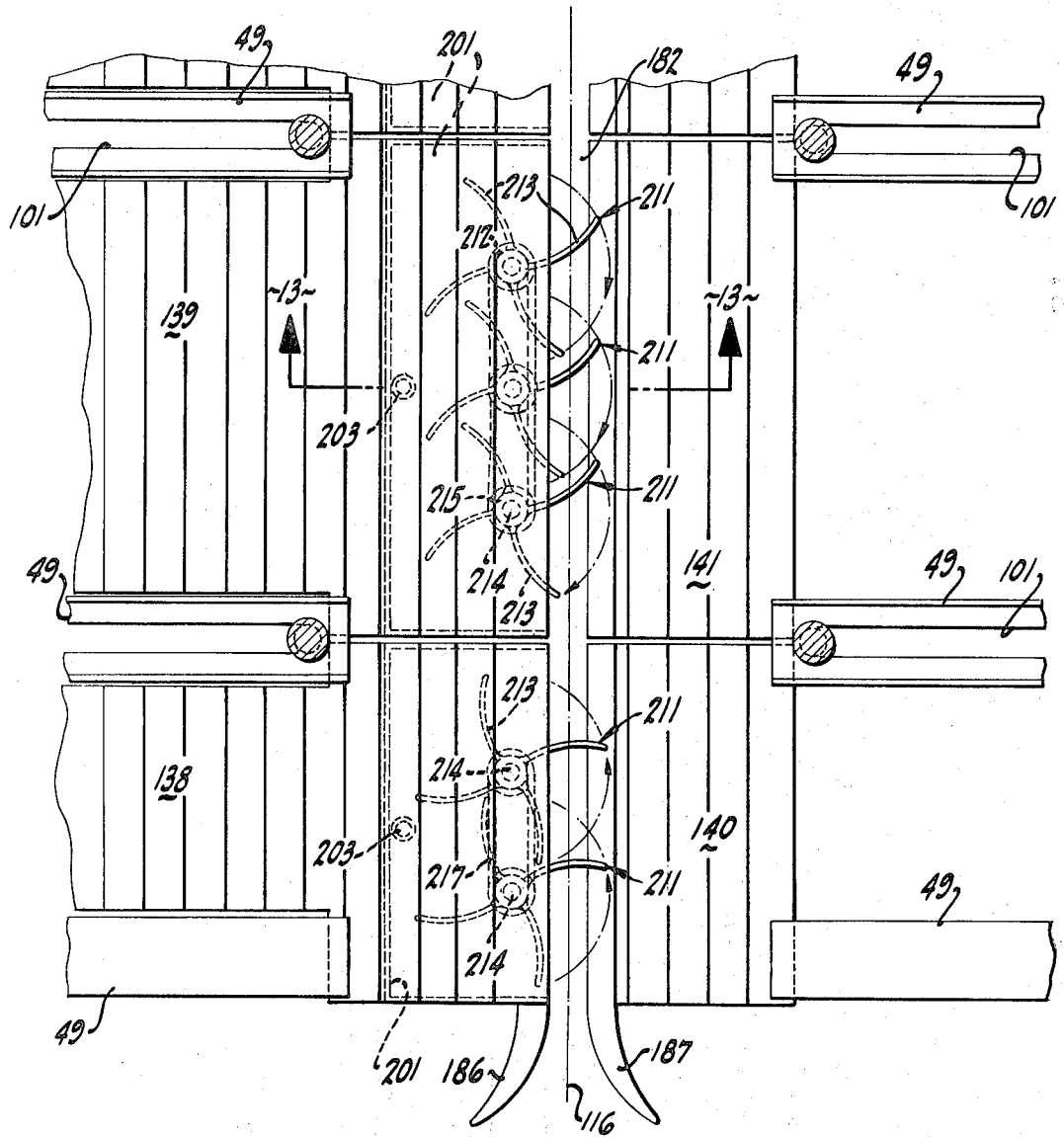
FIG. 12 is a horizontal sectional view through a modified embodiment of the machine corresponding generally to the view of FIG. 3 and illustrating a modification of the crop collection means utilizable in the subject machine.

While in most instances the structure described previously for insuring that grapes traverse the gap between opposed segments of the crop collecting means are adequate, under the alternative arrangement shown in FIG. 12, additional structure is provided for assisting such transfer. In the arrangement shown in FIGS. 12 and 13, such transfer assisting means comprises a series of multi-bladed rotatable impeller members each of which is designated 211 and each of which is defined by a series of flexible generally radially extending blades 213 as best seen in FIG. 12. The number of such impellers, and the number of blades on each, may be varied to meet a particular need. In any event, it is preferred that such impellers are formed from a generally rigid yet flexible material sufficiently strong to contact and urge harvested grapes across the gap between opposed segments of the crop collecting means. A suitable non-metallic material such as nylon is effective for that purpose.

The impellers are rotated in the direction of the arrows shown in FIG. 12 and because the blades of adjacent impellers are synchronized to rotate within each other, an effective sweeping action of any grapes which tend to fall through the gap is produced.

Figure 13:
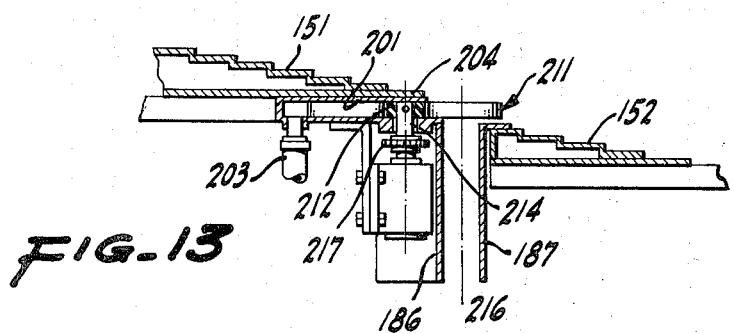
FIG. 13 is a vertical sectional view through the modified crop collection means of FIG. 12 taken in the plane of line 13—13 thereof.

It will be noted from FIGS. 12 and 13 that the pneumatic blower structure described previously is provided in conjunction with the impellers to perform the function attributed thereto previously, namely to assist in movement of grapes across the gap as well as to effect blowing of leaves and bits of vines and branches away from the harvested grapes.

In that connection, referring to FIG. 13, it will be noted that the impellers preferably are mounted within the pneumatic chamber 201 described previously adjacent the mouth 204 thereof. To that end, each impeller is provided with a hub 212 from which the blades 213 thereof radiate. In that connection, the blades may be provided with any particular configuration found most effective for sweeping grapes across the gap of the crop collecting means and it will be noted that such blades will tend to bend opposite to the direction of rotation thereof as seen in FIG. 12 because of their flexibility.

Each impeller is mounted on a pivot shaft 214 in the manner seen in FIG. 13. One of such pivot shafts of each impeller group is operatively connected with a pneumatic or hydraulic motor 216 of the type described previously which activates its associated shaft 214. The impellers of each segment of the crop collection means are interconnected for simultaneous driving by means of a drive chain and sprocket construction 217 in the manner seen in FIG. 13. Thus, upon rotation of one impeller by a motor of the type described, all impellers in the series are simultaneously driven.

Having thus made a full disclosure of various embodiments and features of the subject row crop harvesting machine, the disclosure of which is intended to be illustrative rather than limiting on the invention disclosed, reference is directed to the appended claims for the scope of protection to be afforded thereto.

I claim:

1. A machine for harvesting grapes and like row crops, comprising
   A. a carriage movable along a crop row,
   B. opposed crop picking units supported by said carriage and positioned in opposing relationship on opposite sides of a crop row to be picked as said carriage moves therealong, each picking unit comprising
      1. a mounting plate,
      2. at least one elongated picking arm, defined by a flexible and resilient body, projecting from said mounting plate towards an opposing picking unit into the crop row to be picked,
      3. structure mounting said picking arm on said mounting plate for rotation about its longitudinal axis,
         a. said structure permitting said arm to wobble and bend during rotation thereof, and
   C. means for rotating the picking arms of all said picking units about their longitudinal axes simultaneously as said carriage moves along said crop row with said picking arms projecting into the vines of said crop row so that the respective picking arms frictionally contact the row crop to separate the grapes from the vines thereof,
      1. said means for rotating said picking arms including mechanism for rapidly rotating each said arm in short reverse clockwise and counterclockwise cycles to effect repeated reversal of the direction of rotation of such arm about its longitudinal axis,
      2. rotation of each said arm being accompanied by a whipping and flailing action as such arm bends and moves in an offset path in response to centrifugal forces acting on the flexible and resilient body thereof.

2. The machine of claim 1 in which each said picking arm includes an offset portion at its outer end which comprises a laterally offset integral nose which extends at a predetermined angle relative to said arm longitudinal axis, said offset nose portion rotating in eccentric fashion with said arm relative to said longitudinal axis to flail said grapes from said vines during operation of said machine.

3. The machine of claim 1 which further includes
   D. collection means carried by said carriage and supported beneath said picking units for gathering grapes deposited thereon after separation from said vines.

4. The machine of claim 3 in which said collection means comprises
   1. laterally spaced reciprocating plate sections having a gap therebetween positioned on opposite sides of the center line of the crop row being harvested, and 2. mechanisms for rapidly reciprocating said plate sections relative to said center line to move grapes deposited thereon laterally of said machine.

5. The machine of claim 4 in which each of said plate sections includes
   a. riffle plate structure designed to insure lateral movement of grapes deposited thereon toward a side of said machine.

6. The machine of claim 4 in which said collection means further includes
   3. conveyor mechanisms positioned to receive grapes from said plate sections and to transfer the same to a collecting vehicle moving in conjunction with said carriage.

7. The machine of claim 4 in which said plate sections are reciprocated in a fashion to move grapes deposited thereon laterally toward the same side of said machine, grapes deposited on one of said plate sections traversing the gap between said sections during movement thereof toward said side of said machine.

8. The machine of claim 7 in which said collection means further includes
   3. pneumatic structure for directing a stream of air toward the gap between said spaced plate sections to assist grapes in traversing said gap and to separate unwanted debris which is lighter than said grapes from said grapes.

9. The machine of claim 7 in which said collection means further includes
   3. impeller structure supported beneath one of said plate sections, said impeller structure including
      a. a series of rotatable impeller members positioned to sweep across the gap between said spaced plate sections to assist grapes in traversing said gap as such grapes move from one of said plate sections onto the other.

10. The machine of claim 9 in which said collection means further includes
    4. pneumatic structure for directing a stream of air toward the gap between said spaced plate sections to further assist grapes in traversing said gap and to separate unwanted debris which is lighter than said grapes from said grapes.

11. The machine of claim 4 in which said collection means further includes
    3. spring structure operatively engaged with each of said plate sections for normally urging said plate sections toward each other to minimize the gap therebetween to permit movement of said plate sections away from each other as required when such plate sections contact a trunk of a grape vine during movement of said carriage along a crop row.

12. The machine of claim 5 in which each said riffle plate structure is supported for reciprocation by pivotal mounting links for pendulum like motion during reciprocation thereof.

13. The machine of claim 1 which further includes
    D. at least one crop picking unit constructed as recited in claim 1 and supported by said carriage to overlie the crop row to be picked,
       1. a picking arm of such picking unit depending from said picking unit to project into such crop row from overhead as said carriage moves therealong.

14. The machine of claim 1 in which each of said picking units includes a plurality of said picking arms positioned in spaced relationship relative to each other on said mounting plate, said means for rotating said picking arms effecting rotation of all the arms of each picking unit in unison.

15. The machine of claim 14 in which said means for rotating said picking arms effects rotation of adjacent arms of each picking unit in opposite directions relative to each other.

16. The machine of claim 1 which includes at least two of said picking units constructed as recited in claim 1 positioned adjacent each other along each of said opposite sides of said machine.

17. The machine of claim 1 in which said mounting structure separably secures each of said picking arms with its associated mounting plate so that worn arms may be replaced by new arms and so that arms of different sizes may be positioned in the machine in accordance with the character of the row crop being harvested.

18. The machine of claim 2 in which each of said picking arms further includes
    a. an elongated sleeve member rotatably surrounding the same inwardly of said offset portion thereon to assist in precluding fouling of such arm with vines of the crop row being picked.

19. The machine of claim 2 in which each of said picking arms further includes
    a. at least one auxiliary picking element provided thereon between opposite ends thereof.

20. The machine of claim 19 in which such auxiliary picking element comprises a mallet member which projects laterally from said picking arm to assist in severing grapes from their vines during rotation of such picking arm.

21. The machine of claim 20 in which each said mallet member is pivotally connected with its supporting picking arm by pivot structure interposed between the body of said arm and an end of said mallet member.

22. The machine of claim 1 which further includes
    D. means mounting each of said picking units for in and out reciprocation relative to the center line of the crop row to be picked to effect insertion and retraction of said picking arms relative to said center line as the same are rotating to position nose portions of said picking arms in difficult to reach inner areas of the crop row to be picked.

23. The machine of claim 1 which further includes
    D. means adjustably mounting each of said picking units on said carriage so that each such unit may be selectively positioned relative to the center line of the crop row to be picked so that the axes of said picking arms may be selectively angularly oriented relative to such center line.

24. The machine of claim 23 which further includes

E. means mounting each of said picking units for in and out reciprocation relative to the center line of the crop row to be picked to effect insertion and retraction of said picking arms relative to said center line as the same are rotating to position nose portions of said picking arms in difficult to reach inner areas of the crop row to be picked.

25. The machine of claim 23 in which said means adjustably mounting said picking units includes structure for selectively altering the vertical orientation of the picking arms of said units relative to the ground in accordance with the size of the crop row to be picked.

26. The machine of claim 22 in which said means mounting said picking units for reciprocation includes 1. guide structure for effecting movement of said picking arms in generally a straight line path relative to the center line of the crop row being picked.

27. The machine of claim 22 in which said means mounting said picking units for reciprocation includes 1. guide structure for effecting movement of said picking arms in generally a curvilinear path relative to the center line of the crop row being picked.

28. The machine of claim 16 which includes means mounting said picking units for reciprocation including 1. guide structure for effecting movement of said picking arms of said picking units in generally a curvilinear path relative to the center line of the crop row being picked,
2. the guide structure of adjacent picking units on each side of said machine being operative to bring the picking arms of such adjacent picking units alternately toward and away from each other generally in scissors fashion as such units reciprocate relative to said crop row center line.

29. The machine of claim 1 in which each of said elongated picking arms is defined by a non-metallic body having a flexible metal core extending longitudinally thereof.

30. The machine of claim 29 in which each of said picking arms includes at least one mallet member pivotally secured to said metal core for pivotal extension and retraction relative to the axis of said arm during contact of such mallet with vines of the crop row as the arm rotates during picking.

31. A machine for harvesting grapes and like row crops, comprising

A. a carriage movable along a row crop,
B. a series of opposed crop picking units supported by said carriage and positioned in opposing relationship along opposite sides of and above a crop row to be picked as said carriage moves therealong, each picking unit comprising
  1. a mounting plate,
  2. a plurality of elongated picking arms, each of which is defined by a flexible and resilient body, projecting in spaced relationship from said mounting plate into the crop row to be picked,
    a. each said picking arm including an integral offset nose portion at its outer end which projects from said arm at a predetermined angle relative to the longitudinal axis thereof, and
  3. structure mounting said picking arms on said mounting plate for rotation about its longitudinal axis,
    a. said structure permitting said arm to wobble and bend during rotation thereof, and
C. means for rotating the picking arms of all said picking units about their longitudinal axes simultaneously as said carriage moves along said crop row with said picking arms projecting into the vines of said crop row so that the offset nose portions of the respective picking arms will rotate in eccentric fashion to flail the row crop to separate the grapes from the vines thereof
  1. said means for rotating said picking arms including mechanism for rapidly rotating each said arm in short reverse clockwise and counterclockwise cycles to effect repeated reversal of the direction of rotation of such arm about its longitudinal axis,
  2. rotation of each said arm being accompanied by a whipping and flailing action as such arm bends and moves in an offset path in response to centrifugal forces acting on the flexible and resilient body thereof.

32. The machine of cliam 31 in which said mounting structure separably secures each of said picking arms with said mounting plate so that worn arms may be replaced by new arms and so that arms of different sizes may be positioned in the machine in accordance with the character of the row crop being harvested.

33. The machine of claim 31 which further includes

D. collection means carried by said carriage and positioned for gathering grapes deposited thereon after separation from said vines, said collection means comprising
  1. laterally spaced reciprocating riffle plate sections having a gap therebetween positioned on opposite sides of the center line of the crop row being harvested, and
  2. mechanisms for rapidly reciprocating said riffle plate sections relative to said center line to move grapes laterally of said machine toward one side thereof for collection thereat.

34. The machine of claim 33 in which said collection means further includes 3. conveyor mechanisms positioned adjacent said one side of said machine for receiving grapes from said riffle plate sections and transferring the same to a collecting vehicle moving in conjunction with said carriage.

35. The machine of claim 34 in which said collection means further includes 4. pneumatic structure for directing a stream of air toward the gap between said spaced plate sections to assist grapes in traversing said gap and to separate unwanted debris which is lighter than said grapes from said grapes.

36. The machine of claim 34 in which said collection means further includes 4. impeller structure supported beneath one of said plate sections, said impeller structure including
  a. a series of rotatable impeller members positioned to sweep across the gap between said spaced plate sections to assist grapes in traversing said gap as such grapes move from one of said plate sections onto the other.

37. The machine of claim 36 in which said collection means further includes 5. pneumatic structure for directing a stream of air toward the gap between said spaced plate sections to further assist grapes in traversing said gap and to separate unwanted debris which is lighter than said grapes from said grapes.

38. The machine of claim 33 in which said collection means further includes 3. spring structure operatively engaged with each of said riffle plate sections for normally urging said plate sections toward each other to minimize the gap therebetween and to permit movement of said plate sections away from each other as required when such plate sections contact a trunk of a grape vine during movement of said carriage along a crop row.

39. The machine of claim 31 in which said means for rotating said picking arms effects rotation of adjacent arms of each picking unit in opposite directions relative to each other.

40. The machine of claim 31 in which each of said picking arms further includes
  b. at least one auxiliary mallet picking element provided thereon between opposite ends thereof which projects laterally therefrom to assist in severing grapes from their supporting vines during rotation of such picking arm.

41. The machine of claim 31 which further includes

D. means mounting each of said picking units for in and out reciprocation relative to the center line of the crop row to be picked to effect insertion and retraction of said picking arms relative to said center line as the same are rotating to position the nose portions of said picking arms in difficult to reach inner areas of the crop row to be picked.

42. The machine of claim 31 which further includes

D. means adjustably mounting each of said picking units on said carriage so that each such unit may be selectively positioned relative to the center line of the crop row to be picked so that the axes of said picking arms may be selectively angularly oriented relative to such center line.

43. The machine of claim 42 which further includes
  E. means mounting each of said picking units for in and out reciprocation relative to the center line of the crop row to be picked to effect insertion and retraction of said picking arms relative to said center line as the same are rotating to position the nose portions of said picking arms in difficult to reach inner areas of the crop row to be picked.

44. The machine of claim 41 in which said means mounting said picking units for reciprocation includes 1. guide structure for effecting movement of said picking arms in generally a straight line path relative to the center line of the crop row being picked.

45. The machine of claim 41 in which said means mounting said picking units for reciprocation includes 1. guide structure for effecting movement of said picking arms in generally a curvilinear path relative to the center line of the crop row being picked.

46. The machine of claim 41 in which said means mounting said picking units for reciprocation includes 1. guide structure for effecting movement of said picking arms in generally a curvilinear path relative to the center line of the crop row being picked,
  2. the guide structure of adjacent picking units on each side of said machine being oriented to bring the picking arms of such adjacent picking units alternately toward and away from each other generally in scissors fashion as such units reciprocate relative to said crop row center line.

47. In a machine for harvesting grapes and like row crops,
  A. a crop picking unit to be positioned adjacent a crop row to be picked as said machine moves therealong, said picking unit comprising
    1. a mounting plate,
    2. a plurality of spaced elongated picking arms, each of which is defined by a flexible and resilient body, projecting from said mounting plate toward the crop row to be picked,
    3. structure mounting each said picking arm on said mounting plate for rotation about its longitudinal axis,
      a. said structure permitting said arm to wobble and bend during rotation thereof, and
  B. means for rotating the picking arms of said picking unit simultaneously as said machine moves along said crop row with said picking arms projecting into the vines of said crop row so that the respective picking arms will rotate and wobble in eccentric fashion to flail the row crop to separate the grapes from the vines thereof,
    1. said means for rotating said picking arms including mechanism for rapidly rotating each said arm in short reverse clockwise and counterclockwise cycles to effect repeated reversal of the direction of rotation of such arm about its longitudinal axis,
    2. rotation of each said arm being accompanied by a whipping and flailing action as such arm bends and moves in an offset path in response to centrifugal forces acting on the flexible and resilient body thereof.

48. The machine of claim 47 in which said picking arms are adjustably mounted in said picking unit so that the position of said arms may be selectively varied in accordance with the characteristics of the crop being picked.

49. The machine of claim 47 which further includes

C. means mounting said picking unit for in and out reciprocation relative to the center line of the crop row to be picked to effect insertion and retraction of said picking arms relative to said center line as the same are rotating to position the nose portions of said picking arms in difficult to reach inner areas of the crop row to be picked.

50. The machine of claim 47 in which said means for rotating said picking arms effects rotation of adjacent arms of such picking unit in opposite directions relative to each other.

51. The machine of claim 47 in which each said picking arm includes an offset portion at its outer end which comprises a laterally offset integral nose which extends at a predetermined angle relative to said arm longitudinal axis, said offset nose portion rotating in eccentric fashion with said arm relative to said longitudinal axis to flail said grapes from said vines during operation of said machine.

52. The machine of claim 47 in which said mounting structure separably secures each of said picking arms with said mounting plate so that worn arms may be replaced by new arms and so that arms of different sizes may be positioned in the machine in accordance with the character of the row crop being harvested.

53. The machine of claim 47 in which each of said picking arms further includes a. an elongated sleeve member rotatably surrounding said arm to assist in precluding fouling of said arms with vines of the crop row being picked.

54. The machine of claim 47 in which each of said picking arms includes
   a. at least one auxiliary picking element provided thereon between opposite ends thereof.

55. The machine of claim 54 in which each such auxiliary picking element comprises a mallet member which projects laterally from said arm to assist in severing grapes from their supporting vines during rotation of said arm.

56. The machine of claim 55 in which each such mallet member is pivotally connected with its supporting picking arm by pivot structure interposed between the body of said arm and an end of said mallet member.

57. In a machine for harvesting grapes and like row crops,
   A. collection means for gathering grapes deposited thereon after separation thereof from a crop row, comprising
      1. laterally spaced reciprocating riffle plate sections having a gap therebetween positioned on opposite sides of the center line of the crop row being harvested, and
      2. mechanisms for rapidly reciprocating said plate sections relative to said center line to move grapes deposited thereon laterally toward one side of said machine.

58. The machine of claim 57 in which said collection means further includes
   3. conveyor mechanisms positioned adjacent said one side of said machine for receiving grapes from said plate sections and for transferring the same to a collecting vehicle moving in conjunction with said machine.

59. The machine of claim 57 in which said collection means further includes
   3. pneumatic structure for directing a stream of air toward the gap between said spaced riffle plate sections to assist grapes in traversing said gap and to separate unwanted debris which is lighter than said grapes from said grapes.

60. The machine of claim 57 in which said collection means further includes
   3. impeller structure supported beneath one of said riffle plate sections, said impeller structure including
      a. a series of rotatable impeller members positioned to sweep across the gap between said spaced plate sections to assist grapes in traversing said gap as such grapes move from one of said plate sections onto the other.

61. The machine of claim 60 in which said collection means further includes
   4. pneumatic structure for directing a stream of air toward the gap between said spaced plate sections to further assist grapes in traversing said gap and to separate unwanted debris which is lighter than said grapes from said grapes.

62. The machine of claim 57 in which said collection means further includes
   3. spring structure operatively engaged with each of said riffle plate sections for normally urging said plate sections toward each other to minimize the gap therebetween and to permit movement of said plate sections away from each other as required when such plate sections contact a trunk of a row crop during movement of said machine therealong.

63. In a movable wheeled machine for mechanically harvesting grapes and like agricultural row crops as said machine moves along a crop row to be harvested, the combination comprising
   A. a wheeled carriage movable along the crop row to be harvested, and
   B. an elongated picking arm structure mounted upon and supported by said carriage to be inserted into the crop to be harvested and rotatably moved therein as said carriage moves therealong to separate the crop from its supporting vines or branches, said arm structure comprising
      1. at least one elongated picking arm defined by a generally flexible and resilient body,
      2. means extending generally axially of said body from an inner end thereof for connecting said body with a picking unit positioned in said machine for rotating said arm concentrically about its longitudinal axis,
      3. said body terminating in an integral offset nose portion at its outer end which projects outwardly from said longitudinal axis of said body at a predetermined angle relative to the longitudinal axis of said body whereby said nose portion rotates and wobbles in eccentric fashion relative to said longitudinal axis during rotation of said arm about said axis by said picking unit.

64. The picking arm of the combination of claim 63 in which said arm is defined by a non-metallic body having a flexible metal core extending longitudinally thereof.

65. The picking arm of the combination of claim 63 which further includes
   4. at least one auxiliary picking element provided thereon between opposite ends thereof.

66. The picking arm of the combination of claim 64 in which said picking arm further includes
   4. at least one mallet member pivotally secured to said metal core for pivotal extension and retraction relative to the axis of said arm during contact of such mallet with vines or branches of the crop row as the arm rotates during crop picking.

67. The picking arm of the combination of claim 63 which further includes
   4. an elongated sleeve member rotatably surrounding said body inwardly of said offset nose portion thereof to assist in precluding fouling of said arm with vines or branches of said crop during rotation of said arm.

68. A machine for harvesting grapes and like row crops, comprising
   A. a carriage movable along a crop row,
   B. opposed crop picking units supported by said carriage and positioned in opposing relationship on opposite sides of a crop row to be picked as said carriage moves therealong, each picking unit comprising
      1. a mounting plate,
      2. at least one elongated picking arm projecting from said mounting plate towards an opposing picking unit into the crop row to be picked,
         a. said picking arm including an offset portion which projects outwardly from said arm relative to the longitudinal axis thereof, and 3. structure mounting said picking arm on said mounting plate for rotation about its longitudinal axis,
C. means for rotating the picking arms of all said picking units simultaneously as said carriage moves along said crop row with said picking arms projecting into the vines of said crop row so that the offset portions of the respective picking arms frictionally contact the row crop to separate the grapes from the vines thereof, and
D. collection means carried by said carriage and supported beneath said picking units for gathering grapes deposited thereon after separation from said vines, comprising
1. laterally spaced reciprocating plate sections having a gap therebetween positioned on opposite sides of the center line of the crop row being harvested, and
2. mechanisms to effect rapid reciprocation of such plate sections relative to said center line to move grapes deposited thereon laterally of said machine.

69. The machine of claim 68 in which each of said plate sections includes
a. riffle plate structure designed to insure lateral movement of grapes deposited thereon toward a side of said machine.

70. The machine of claim 68 in which said collection means further includes
3. conveyor mechanisms positioned to receive grapes from said plate sections and to transfer the same to a collecting vehicle moving in conjunction with said carriage.

71. The machine of claim 68 in which said plate sections are reciprocated in a fashion to move grapes deposited thereon laterally toward the same side of said machine, grapes deposited on one of said plate sections traversing the gap between said sections during movement thereof toward said side of said machine.

72. The machine of claim 68 in which said collection means further includes
3. pneumatic structure for directing a stream of air toward the gap between said spaced plate sections to assist grapes in traversing said gap and to separate unwanted debris which is lighter than said grapes from said grapes.

73. The machine of claim 72 in which said collection means further includes
3. impeller structure supported beneath one of said plate sections, said impeller structure including
a. a series of rotatable impeller members positioned to sweep across the gap between said spaced plate sections to assist grapes in traversing said gap as such grapes move from one of said plate sections onto the other.

74. The machine of claim 73 in which said collection means further includes
4. pneumatic structure for directing a stream of air toward the gap between said spaced plate sections to further assist grapes in traversing said gap and to separate unwanted debris which is lighter than said grapes from said grapes.

75. The machine of claim 68 in which said collection means further includes
3. spring structure operatively engaged with each of said plate sections for normally urging said plate sections toward each other to minimize the gap therebetween to permit movement of said plate sections away from each other as required when such plate sections contact a trunk of a grape vine during movement of said carriage along a crop row.

76. The machine of claim 69 in which each said riffle plate structure is supported for reciprocation by pivotal mounting links for pendulum like motion during reciprocation thereof.

* * * * *